United States Patent
Nishiguchi et al.

(10) Patent No.: US 9,689,985 B2
(45) Date of Patent: Jun. 27, 2017

(54) LASER RADAR DEVICE AND OBJECT DETECTION METHOD

(71) Applicants: Tadao Nishiguchi, Aichi (JP); Daisuke Itao, Aichi (JP); Satoshi Hirota, Aichi (JP)

(72) Inventors: Tadao Nishiguchi, Aichi (JP); Daisuke Itao, Aichi (JP); Satoshi Hirota, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 389 days.

(21) Appl. No.: 14/577,776

(22) Filed: Dec. 19, 2014

(65) Prior Publication Data

US 2015/0185320 A1 Jul. 2, 2015

(30) Foreign Application Priority Data

Dec. 27, 2013 (JP) .................. 2013-273067

(51) Int. Cl.
G01C 3/08 (2006.01)
G01S 17/02 (2006.01)
(Continued)

(52) U.S. Cl.
CPC ............ G01S 17/026 (2013.01); G01S 7/487 (2013.01); G01S 7/4861 (2013.01);
(Continued)

(58) Field of Classification Search
CPC ........ G01S 7/4861; G01S 7/487; G01S 7/497; G01S 7/4863; G01S 17/936; G01S 17/026; G01S 17/42; G01S 17/10
(Continued)

(56) References Cited

U.S. PATENT DOCUMENTS

2010/0231891 A1  9/2010 Mase et al.
2013/0321791 A1* 12/2013 Feldkhun ........... G01B 11/2518
                                                                  356/4.01

FOREIGN PATENT DOCUMENTS

JP   H07-191148 A   7/1995
JP   2009-047662 A  3/2009
(Continued)

OTHER PUBLICATIONS

First Notification of Office Action issued in corresponding Chinese Application No. 201410830786.X, mailed on Sep. 20, 2016 (25 pages).
(Continued)

Primary Examiner — Mark Hellner
(74) Attorney, Agent, or Firm — Osha Liang LLP

(57) ABSTRACT

A laser radar device includes: a projection part repeatedly performing processing of projecting measurement light that is of a pulsed laser beam to a predetermined monitoring area in a measurement period having a predetermined first length, the processing being repeated in c cycles (c≥2) in a detection period having a predetermined second length; a light receiver including n1 (n1≥2) light receiving elements and receiving reflected light of the measurement light in directions different from one another; a selector selecting light receiving signals of the n1 light receiving elements in each measurement period and output n2 (n2≥2) light receiving signals; a sampling part sampling the light receiving signals output from the selector s (s≥2) times every time the measurement light is projected; and a detector performing processing of detecting an object in a detection-period-based period based on sampling values.

9 Claims, 16 Drawing Sheets

(51) Int. Cl.
    *G01S 7/486*    (2006.01)
    *G01S 17/93*    (2006.01)
    *G01S 7/487*    (2006.01)
    *G01S 17/10*    (2006.01)
    *G01S 17/42*    (2006.01)
    *G01S 7/497*    (2006.01)

(52) U.S. Cl.
    CPC ............ *G01S 7/4863* (2013.01); *G01S 7/497* (2013.01); *G01S 17/10* (2013.01); *G01S 17/42* (2013.01); *G01S 17/936* (2013.01)

(58) Field of Classification Search
    USPC ........................................................ 356/4.01
    See application file for complete search history.

(56) References Cited

FOREIGN PATENT DOCUMENTS

| | | |
|---|---|---|
| JP | 2012-093312 A | 5/2012 |
| JP | 2012-242218 A | 12/2012 |
| JP | 2013-033024 A | 2/2013 |
| JP | 2013-246087 A | 12/2013 |
| WO | 2013180110 A1 | 12/2013 |

OTHER PUBLICATIONS

Notification of Reasons for Refusal issued in corresponding Japanese Application No. 2013-273067, mailed on Apr. 5, 2016 (11 pages).

\* cited by examiner

LASER RADAR DEVICE AND OBJECT DETECTION METHOD

CROSS-REFERENCE TO RELATED APPLICATION

This application is based on Japanese Patent Application No. 2013-273067 filed with the Japan Patent Office on Dec. 27, 2013, the entire contents of which are incorporated herein by reference.

FIELD

The disclosure relates to a laser radar device and an object detection method, particularly to a laser radar device and an object detection method for improving object detection accuracy.

BACKGROUND

Conventionally, various technologies of improving the detection accuracy are proposed in a laser radar device, which projects a measurement light beam that is of a pulsed laser beam to a predetermined monitoring area to simultaneously receive reflected light in a plurality of directions using a plurality of light receiving elements.

For example, in one of the proposed technologies, the plurality of light receiving elements are selected with any combination, and light receiving signals output from the selected light receiving elements are output while added, thereby enhancing light sensitivity. It has been proposed that degradation of resolution in a horizontal direction due to the addition of the plurality of light receiving signals is constrained by switching the selection of the light receiving element every time the measurement light beam is projected (for example, see Japanese Unexamined Patent Publication No. 7-191148).

For example, in one of the proposed technologies, the light receiving signal used to detect an object is selected from the light receiving signals of the light receiving elements based on a steering angle, and the object is detected using the selected light receiving signal to reduce the scale of a circuit or arithmetic processing necessary to measure the light receiving value. It has been proposed that the light sensitivity is enhanced by integrating the light receiving signals of the identical light receiving element with respect to the plurality of measurement light beams (for example, see Japanese Unexamined Patent Publication No. 2012-242218).

For example, in one of the proposed technologies, the light receiving signal of each light receiving element is sampled at predetermined sampling time intervals, and sampling values of the light receiving signals of the identical light receiving element at each sampling clock time are integrated with respect to the plurality of measurement light beams, thereby enhancing the light sensitivity at each sampling clock time of each light receiving element (for example, see Japanese Unexamined Patent Publication No. 2013-33024).

SUMMARY

One or more embodiments of the disclosure provide a laser radar device and an object detection method capable of improving the object detection accuracy while the circuit scale or arithmetic quantity is constrained in the case that a plurality of reflected light beams are simultaneously received in a plurality of directions using a plurality of light receiving elements.

A laser radar device according to one or more embodiments of the disclosure includes: a projection part configured to repeatedly perform processing of projecting measurement light that is of a pulsed laser beam to a predetermined monitoring area in a measurement period having a predetermined first length, the processing being repeated in c cycles ($c \geq 2$) in a detection period having a predetermined second length; a light receiver that includes n1 ($n1 \geq 2$) light receiving elements receiving reflected light of the measurement light in directions different from one another; a selector configured to select light receiving signals of the n1 light receiving elements in each measurement period and output n2 ($n2 \geq 2$) light receiving signals; a sampling part configured to sample the light receiving signals output from the selector s ($s \geq 2$) times every time the measurement light is projected; and a detector configured to perform processing of detecting an object in a detection-period-based period based on a sampling value obtained by the sampling.

In the laser radar device according to one or more embodiments of the disclosure, the processing of projecting the measurement light that is of the pulsed laser beam is repeatedly performed to the predetermined monitoring area in the measurement period having the predetermined first length, the processing being repeated in c cycles ($c \geq 2$) in the detection period having the predetermined second length, the n1 ($n1 \geq 2$) light receiving elements receive the reflected light of the measurement light in directions different from one another, the light receiving signals of the n1 light receiving elements are selected in each measurement period and n2 ($n2 \geq 2$) light receiving signals are output, the light receiving signals output from the selector are sampled s ($s \geq 2$) times every time the measurement light is projected, and the processing of detecting the object is performed in the detection-period-based period based on the sampling values obtained by the sampling.

Accordingly, in the case that the plurality of reflected light beams are simultaneously received in the plurality of directions using the plurality of light receiving elements, the intensive monitoring direction can freely be changed while the circuit scale or arithmetic quantity is constrained, and the object detection accuracy can be improved.

For example, the projection part is constructed with a driving circuit, a light emitting element, and a projection optical system. For example, the light receiver is constructed with a light receiving optical system and a light receiving element. For example, the selector is constructed with a multiplexer. For example, the sampling part is constructed with an A/D converter. For example, the detector is constructed with an arithmetic device such as a microcomputer and various processors.

In the laser radar device, the selector may select the light receiving signals from the plurality of light receiving elements, add the plurality of selected light receiving signals, and output the added light receiving signal.

Therefore, the object can be detected while the detection directions of the plurality of light receiving elements are combined.

The laser radar device may further include an integrator configured to integrate sampling values of the light receiving signals from the identical light receiving element, the sampling values being sampled at an identical sampling clock time in the detection period. At this point, the projection part projects the measurement light a plurality of times in the measurement period.

Therefore, the light sensitivity of each light receiving element can further be enhanced, and the object detection accuracy can be improved.

For example, the integrator is constructed with an arithmetic device such as a microcomputer and various processors.

In the laser radar device, the integrator may integrate the sampling values throughout the plurality of detection periods.

Therefore, for example, the light sensitivity can be enhanced in a specific direction without degrading the light sensitivity in each direction, and the object detection accuracy can be improved in a specific direction without degrading the object detection accuracy in each direction.

In the laser radar device, the selector may make a selection from the light receiving signals in each of n2 groups and output one light receiving signal in each group, the n1 light receiving elements being divided into the n2 groups.

Therefore, for example, the selector is constructed with n1 multiplexers.

In the laser radar device, $n1 \leq c \times n2$ may hold.

Therefore, the light receiving value of each light receiving element can be measured in one detection period.

In the laser radar device, the sampling part may include n2 A/D converters configured to concurrently sample the n2 light receiving signals output from the selector.

Therefore, the speed of the sampling processing is enhanced.

The laser radar device may be provided in a vehicle, and the selector may increase a frequency of selecting the light receiving signal of the light receiving element receiving reflected light from a traveling direction of the vehicle when the speed of the vehicle is greater than or equal to a predetermined threshold.

Therefore, the farther object can more rapidly be detected during high-speed running.

The laser radar device may be provided in a vehicle, the selector may alternately repeat first selection processing of uniformly selecting the light receiving signal of each of the light receiving elements and second selection processing in which a frequency of selecting the light receiving signal of the light receiving element receiving reflected light from a traveling direction of the vehicle is increased when the detector does not detect the object, and the selector may repeat the first selection processing when the detector detects the object.

Therefore, the object can rapidly be detected in each direction in the monitoring area, and the detected object can surely be tracked after the object is detected.

An object detection method according to one or more embodiments of the disclosure includes: a projection step of repeatedly performing processing of projecting measurement light that is of a pulsed laser beam to a predetermined monitoring area in a measurement period having a predetermined first length, the processing being repeated in c cycles ($c \geq 2$) in a detection period having a predetermined second length; a light receiving step in which n1 ($n1 \geq 2$) light receiving elements receive reflected light of the measurement light in directions different from one another; a selection step of selecting light receiving signals of the n1 light receiving elements in each measurement period and outputting n2 ($n2 \geq 2$) light receiving signals; a sampling step of sampling the light receiving signals output from the selector s ($s \geq 2$) times every time the measurement light is projected; and a detection step of performing processing of detecting an object in a detection-period-based period based on sampling values obtained by the sampling.

In the object detection method according to one or more embodiments of the disclosure, the processing of projecting the measurement light that is of the pulsed laser beam is repeatedly performed to the predetermined monitoring area in the measurement period having the predetermined first length, the processing being repeated in c cycles ($c \geq 2$) in the detection period having the predetermined second length, the n1 ($n1 \geq 2$) light receiving elements receive the reflected light of the measurement light in directions different from one another, the light receiving signals of the n1 light receiving elements are selected in each measurement period and the n2 ($n2 \geq 2$) light receiving signals are output, the light receiving signals output from the selector are sampled s ($s \geq 2$) times every time the measurement light is projected, and the processing of detecting the object is performed in the detection-period-based period based on the sampling values obtained by the sampling.

Accordingly, in the case that the plurality of reflected light beams are simultaneously received in the plurality of directions using the plurality of light receiving elements, the intensive monitoring direction can freely be changed while the circuit scale or arithmetic quantity is constrained, and the object detection accuracy can be improved.

For example, the projection step is performed by the driving circuit, the light emitting element, and the projection optical system. For example, the light receiving step is performed by the light receiving optical system and the light receiving element. For example, the selection step is performed by the multiplexer. For example, the sampling step is performed by the A/D converter. For example, the detection step is performed by the arithmetic device such as a microcomputer and various processors.

According to one or more embodiments of the disclosure, the object detection accuracy can be improved while the circuit scale or arithmetic quantity is constrained in the case that the plurality of reflected light beams are simultaneously received in the plurality of directions using the plurality of light receiving elements.

DETAILED DESCRIPTION

Embodiments of the disclosure will be described with reference to the drawings. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. The description is given in the following order.
1. Embodiments
2. Modifications

1. Embodiments (Configuration Example of Laser Radar Device 11)

Figure 1:
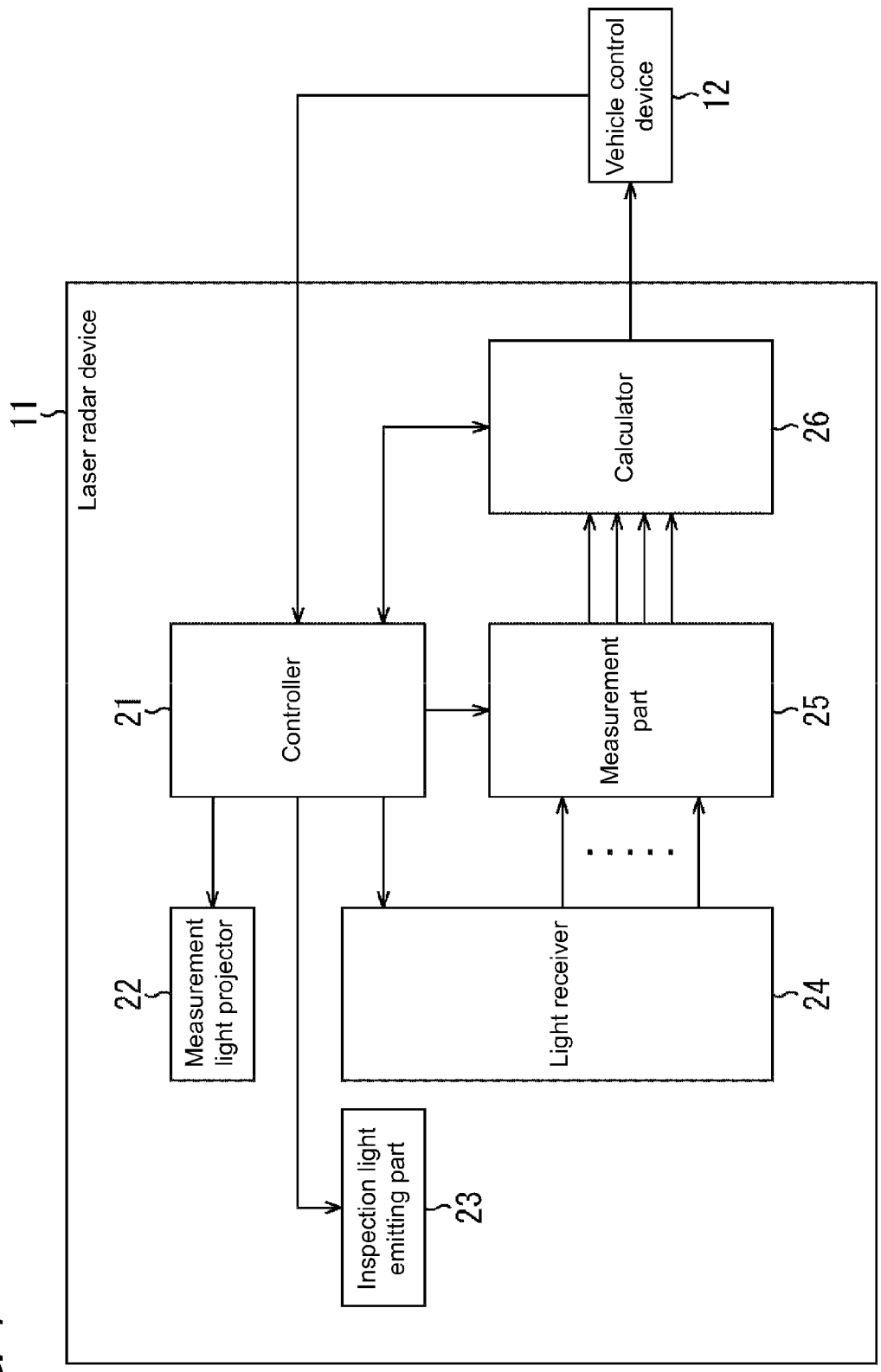
FIG. 1 is a block diagram illustrating a laser radar device according to one or more embodiments of the disclosure.

FIG. 1 illustrates a configuration example of a laser radar device 11 according to one or more embodiments of the disclosure.

For example, the laser radar device 11 is provided in a vehicle to detect an object existing in a traveling direction of the vehicle. Hereinafter, an area where the laser radar device 11 can detect the object is referred to as a monitoring area. Hereinafter, the vehicle in which the laser radar device 11 is provided is referred to as an own vehicle where there is a need for distinguishing the vehicle from another vehicle. Hereinafter, a direction parallel to a right and left direction (vehicle width direction) of the own vehicle is referred to as a horizontal direction.

The laser radar device 11 includes a controller 21, a measurement light projector 22, an inspection light emitting part 23, a light receiver 24, a measurement part 25, and a calculator 26.

The controller 21 controls each part of the laser radar device 11 based on a command and information from a vehicle control device 12.

The measurement light projector 22 projects measurement light, which is of a pulsed laser beam (laser pulse) used to detect the object, to the monitoring area.

The inspection light emitting part 23 emits inspection light, which is used for inspection in the light receiver 24 and the measurement part 25, to the light receiver 24.

The light receiver 24 receives reflected light of the measurement light or the inspection light, and detects the intensity (brightness) of the reflected light or inspection light from different directions in the horizontal direction. The light receiver 24 outputs a plurality of light receiving signals that are of electric signals corresponding to the intensity of the reflected light or inspection light from respective directions.

The measurement part 25 measures a light receiving value based on the light receiving signal supplied from the light receiver 24, and supplies a measurement result to the calculator 26.

The calculator 26 detects the object in the monitoring area based on the measurement result of the light receiving value supplied from the measurement part 25, and supplies a detection result to the controller 21 and the vehicle control device 12.

For example, the vehicle control device 12 is constructed with an ECU (electronic control unit), and performs automatic brake control or issues a warning to a driver based on the detection result of the object in the monitoring area.

(Configuration Example of Measurement Light Projector 22)

Figure 2:
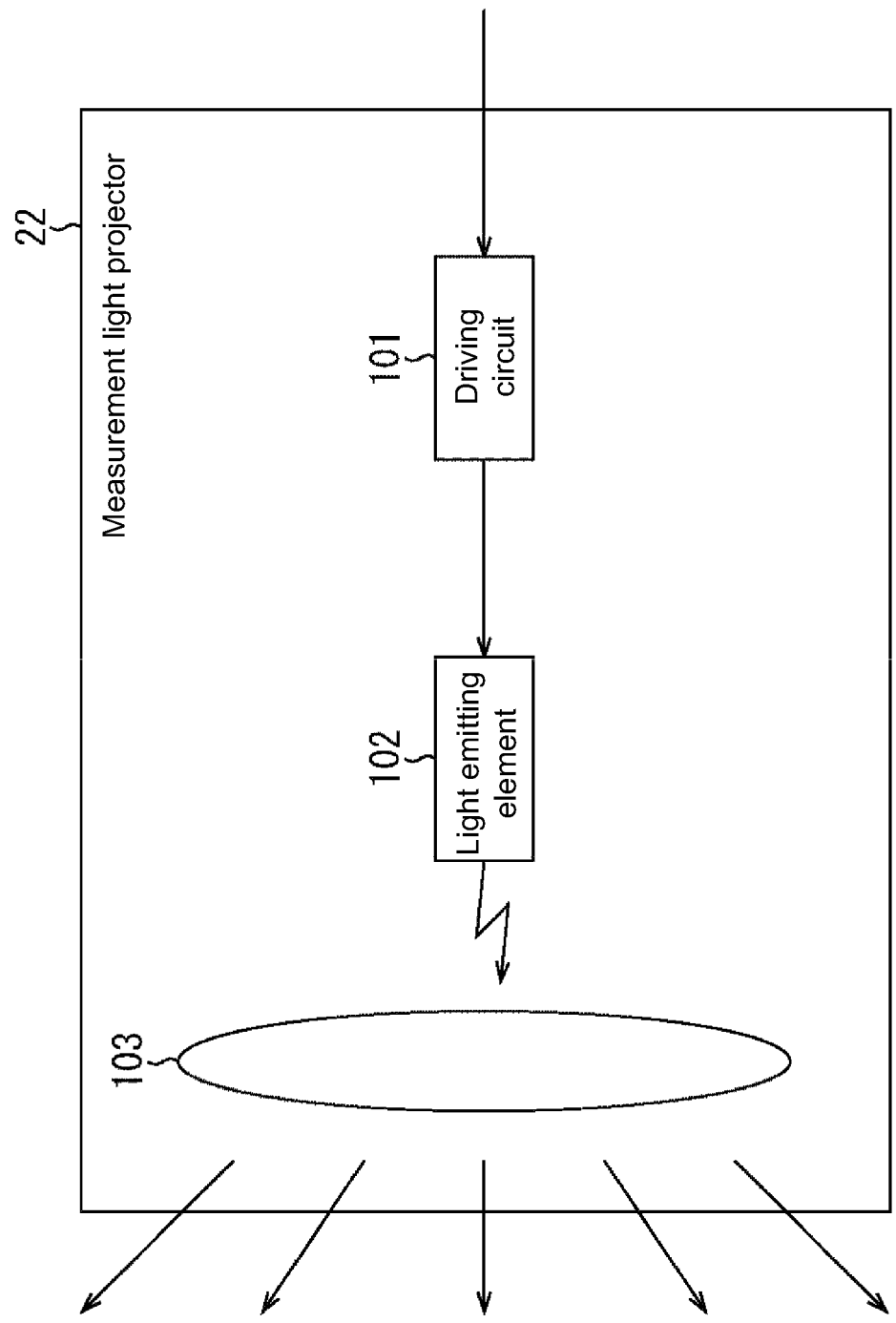
FIG. 2 is a block diagram illustrating a configuration example of a measurement light projector.

FIG. 2 illustrates a configuration example of the measurement light projector 22 of the laser radar device 11. The measurement light projector 22 includes a driving circuit 101, a light emitting element 102, and a projection optical system 103.

The driving circuit 101 controls an emission intensity and an emission time of the light emitting element 102 under the control of the controller 21.

For example, the light emitting element 102 is constructed with a laser diode, and emits the measurement light (laser pulse) under the control of the driving circuit 101. The measurement light emitted from the light emitting element 102 is projected to the monitoring area through the projection optical system 103 constructed with a lens or the like.

(Configuration Examples of Inspection Light Emitting Part 23 and Light Receiver 24)

Figure 3:
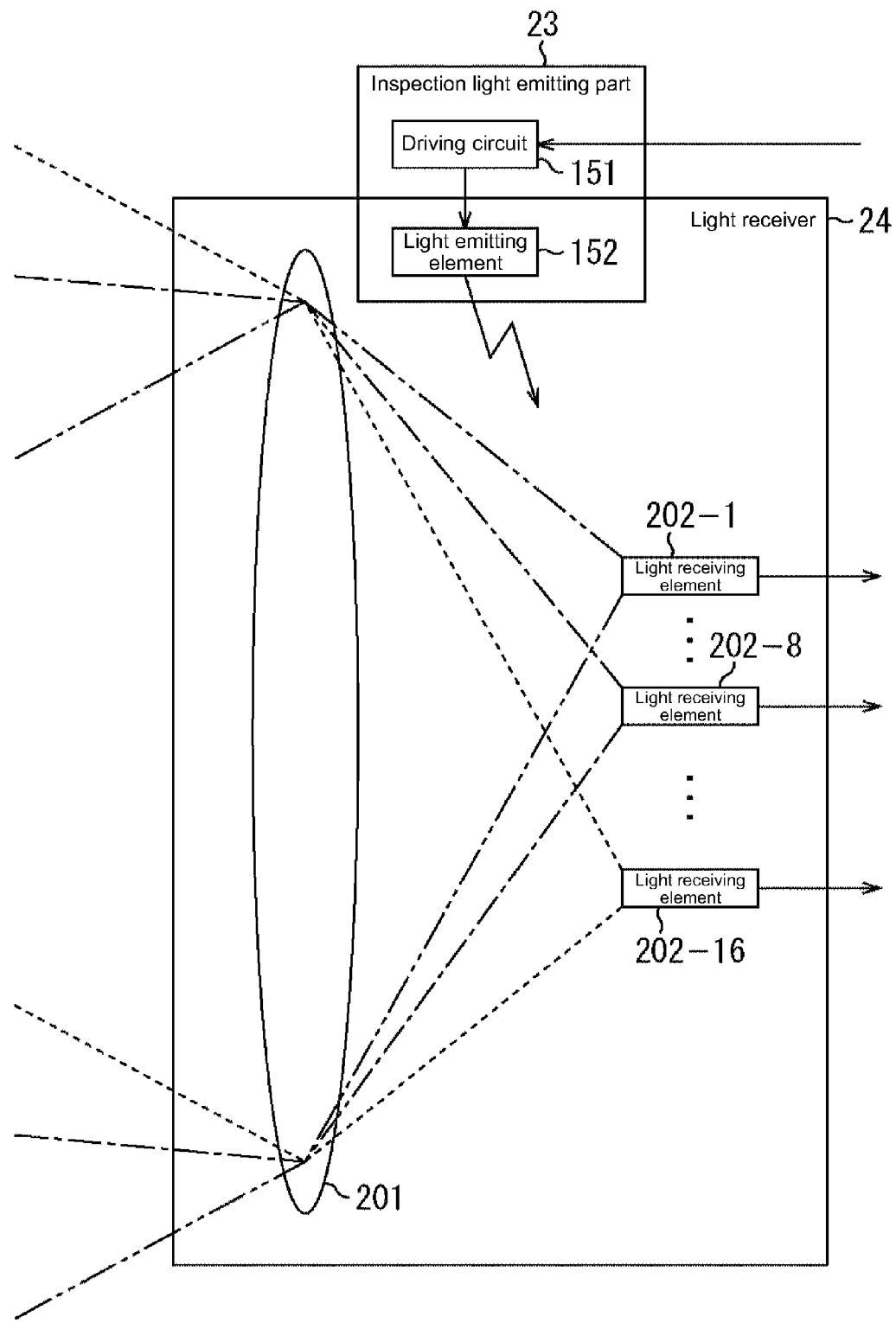
FIG. 3 is a block diagram illustrating configuration examples of an inspection light emitting part and a light receiver.

FIG. 3 illustrates configuration examples of the inspection light emitting part 23 and light receiver 24 of the laser radar device 11. The inspection light emitting part 23 includes a driving circuit 151 and a light emitting element 152. The light receiver 24 includes a light receiving optical system 201 and light receiving elements 202-1 to 202-16.

Hereinafter, the light receiving elements 202-1 to 202-16 are simply referred to as a light receiving element 202 unless the light receiving elements 202-1 to 202-16 need to be distinguished from one another.

The driving circuit 151 controls the emission intensity and emission time of the light emitting element 152 under the control of the controller 21.

For example, the light emitting element 152 is constructed with an LED (light emitting diode), and emits the inspection light composed of pulsed LED light under the control of the driving circuit 151. A light receiving surface of each light receiving element 202 is directly irradiated with the inspection light emitted from the light emitting element 152 that comes without passing through an optical system such as a lens.

The light receiving optical system 201 is constructed with a lens or the like, and installed such that an optical axis of the light receiving optical system 201 is in a front-back direction of the vehicle. The reflected light of the measurement light reflected by an object and the like in the monitoring area is incident to the light receiving optical system 201, and the reflected light is incident to the light receiving surface of each light receiving element 202 through the light receiving optical system 201.

For example, each light receiving element 202 is constructed with a photodiode that photoelectrically converts an incident photo-charge into a light receiving signal of a current value corresponding to a light quantity of the photo-charge. At a position where the reflected light incident to the light receiving optical system 201 is focused, the light receiving elements 202 are provided so as to be arrayed perpendicular to the optical axis of the light receiving optical system 201 and parallel to (that is, the horizontal direction) the vehicle width direction of the own vehicle. The reflected light incident to the light receiving optical system 201 is incident to the light receiving elements 202 while distributed to each light receiving element 202 according to an incident angle to the light receiving optical system 201 with respect to the horizontal direction. Accordingly, each light receiving element 202 receives the reflected light from the different direction in the horizontal direction in the light reflected from the monitoring area. Therefore, the monitoring area is divided into a plurality of areas (hereinafter referred to as detection areas) in a plurality of directions in the horizontal direction, and each light receiving element 202 individually receives the reflected light from the corresponding detection area. The light receiving element 202 photoelectrically converts the received reflected light into the light receiving signal of the current value corresponding to a light receiving quantity of the reflected light, and supplies the obtained light receiving signal to the measurement part 25.

The light receiving element 202 photoelectrically converts the inspection light from the light emitting element 152 into the light receiving signal of the current value corresponding to the light receiving quantity of the inspection light, and supplies the obtained light receiving signal to the measurement part 25.

(Configuration Example of Measurement Part 25)

Figure 4:
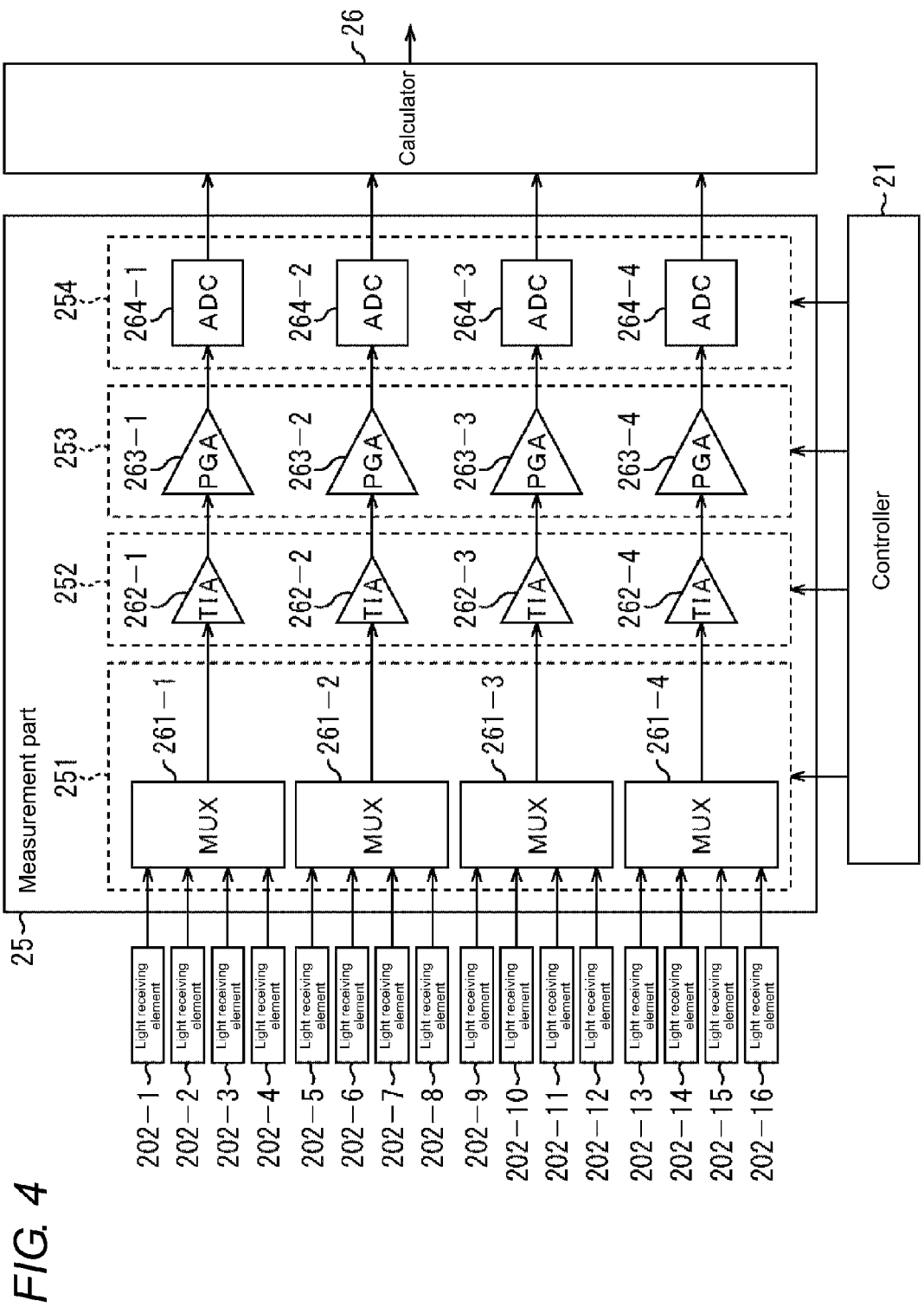
FIG. 4 is a block diagram illustrating a configuration example of a measurement part.

FIG. 4 illustrates a configuration example of the measurement part 25 of the laser radar device 11. The measurement part 25 includes a selector 251, a current-voltage converter 252, an amplifier 253, and a sampling part 254. The selector 251 includes multiplexers (MUXs) 261-1 to 261-4. The current-voltage converter 252 includes transimpedance amplifiers (TIAs) 262-1 to 262-4. The amplifier 253 includes programmable gain amplifiers (PGAs) 263-1 to 263-4. The sampling part 254 includes A/D converters (ADCs) 264-1 to 264-4.

Hereinafter, the MUXs 261-1 to 261-4, the TIAs 262-1 to 262-4, the PGAs 263-1 to 263-4, and the ADCs 264-1 to 264-4 are simply referred to as a MUX 261, a TIA 262, a PGA 263, and an ADC 264 unless each of the MUXs 261-1 to 261-4, the TIAs 262-1 to 262-4, the PGAs 263-1 to 263-4, and the ADCs 264-1 to 264-4 needs to be distinguished from one another.

Under the control of the controller 21, the MUX 261-1 selects at least one of the light receiving signals supplied from the light receiving elements 202-1 to 202-4, and supplies the selected light receiving signal to the TIA 262-1. When selecting the plurality of light receiving signals, the MUX 261-1 adds the selected light receiving signals to each other, and supplies the added light receiving signal to the TIA 262-1.

Under the control of the controller 21, the MUX 261-2 selects at least one of the light receiving signals supplied from the light receiving elements 202-5 to 202-8, and supplies the selected light receiving signal to the TIA 262-2. When selecting the plurality of light receiving signals, the MUX 261-2 adds the selected light receiving signals to each other, and supplies the added light receiving signal to the TIA 262-2.

Under the control of the controller 21, the MUX 261-3 selects at least one of the light receiving signals supplied from the light receiving elements 202-9 to 202-12, and supplies the selected light receiving signal to the TIA 262-3. When selecting the plurality of light receiving signals, the MUX 261-3 adds the selected light receiving signals to each other, and supplies the added light receiving signal to the TIA 262-3.

Under the control of the controller 21, the MUX 261-4 selects at least one of the light receiving signals supplied from the light receiving elements 202-13 to 202-16, and supplies the selected light receiving signal to the TIA 262-4. When selecting the plurality of light receiving signals, the MUX 261-4 adds the selected light receiving signals to each other, and supplies the added light receiving signal to the TIA 262-4.

Accordingly, the light receiving elements 202 are divided into a first group including the light receiving elements 202-1 to 202-4, a second group including the light receiving elements 202-5 to 202-8, a third group including the light receiving elements 202-9 to 202-12, and a fourth group including the light receiving elements 202-13 to 202-16. The MUX 261-1 selects the light receiving element 202 of the first group, and outputs the light receiving signal of the selected light receiving element 202. The MUX 261-2 selects the light receiving element 202 of the second group, and outputs the light receiving signal of the selected light receiving element 202. The MUX 261-3 selects the light receiving element 202 of the third group, and outputs the light receiving signal of the selected light receiving element 202. The MUX 261-4 selects the light receiving element 202 of the fourth group, and outputs the light receiving signal of the selected light receiving element 202.

Under the control of the controller 21, each TIA 262 performs current-voltage conversion of the light receiving signal supplied from the MUX 261. That is, each TIA 262 converts the light receiving signal that is of the input current into the light receiving signal that is of the voltage, and amplifies the voltage of the converted light receiving signal with a gain set by the controller 21. Each TIA 262 supplies the amplified light receiving signal to the subsequent PGA 263.

Under the control of the controller 21, each PGA 263 amplifies the voltage of the light receiving signal supplied from the TIA 262 with a gain set by the controller 21, and supplies the amplified light receiving signal to the subsequent ADC 264.

Each ADC 264 performs an A/D conversion of the light receiving signal. That is, under the control of the controller 21, each ADC 264 measures the light receiving value by sampling the analog light receiving signal supplied from the PGA 263. Each ADC 264 supplies the digital light receiving signal indicating a sampling result (measurement result) of the light receiving value to the calculator 26.

(Configuration Example of MUX 261)

Figure 5:
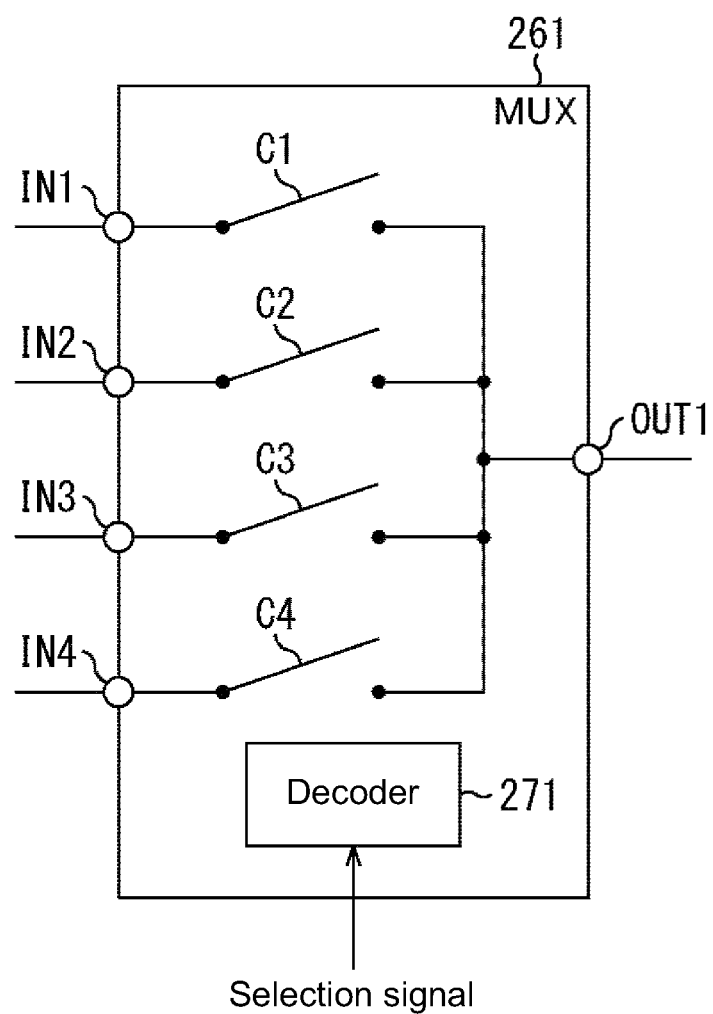
FIG. 5 is a block diagram illustrating a configuration example of a function of a multiplexer.

FIG. 5 schematically illustrates a configuration example of a function of the MUX 261.

The MUX 261 includes a decoder 271, input terminals IN1 to IN4, contacts C1 to C4, and an output terminal OUT1. Ends of the contacts C1 to C4 are connected to the input terminals IN1 to IN4, and other ends of the contacts C1 to C4 are connected to the output terminal OUT1.

Hereinafter, the input terminals IN1 to IN4 and the contacts C1 to C4 are simply referred to as an input terminal IN and a contact C unless each of the input terminals IN1 to IN4 and the contacts C1 to C4 needs to be distinguished from one another.

The decoder 271 decodes a selection signal supplied from the controller 21, and individually switches between on and off states of each contact C according to a content of the decoded selection signal. The light receiving signal, which is input to the input terminal IN connected to the contact C in the on state, is selected and output from the output terminal OUT1. In the case that a plurality of contacts C are in the on states, the plurality of selected light receiving signals are added and output from the output terminal OUT1.

(Configuration Example of Calculator 26)

Figure 6:
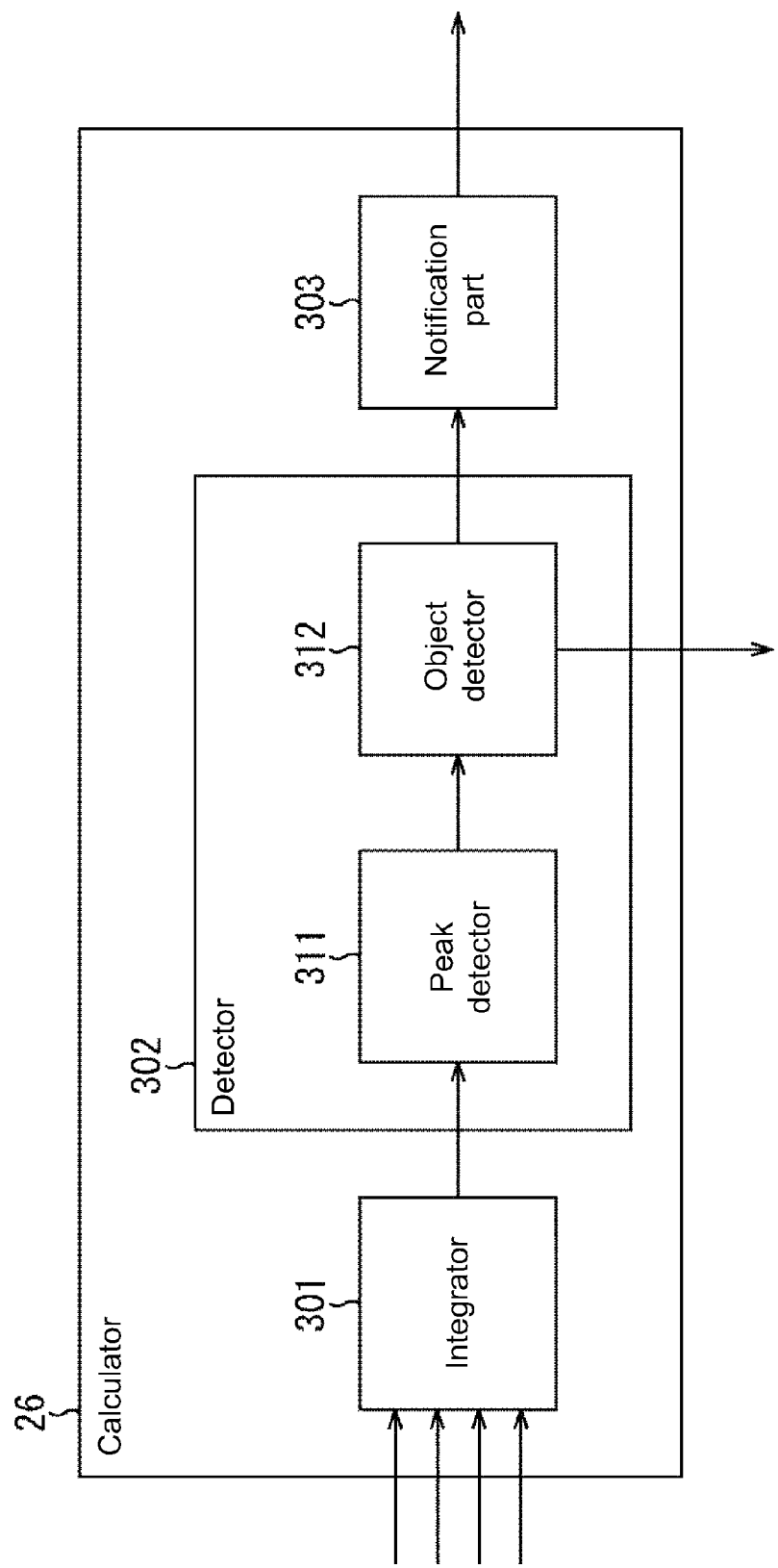
FIG. 6 is a block diagram illustrating a configuration example of a function of a calculator.

FIG. 6 illustrates a configuration example of the calculator 26.

The calculator 26 includes an integrator 301, a detector 302, and a notification part 303. The detector 302 includes a peak detector 311 and an object detector 312.

The integrator 301 integrates the light receiving values of the identical light receiving elements 202 in each sampling clock time, and supplies an integrated value (hereinafter referred to as an integrated light receiving value) to the peak detector 311.

Based on the integrated light receiving value (the intensity of the reflected light) of each light receiving element 202, the peak detector 311 detects peaks in the horizontal direction and time direction (distance direction) of the intensity of the reflected light of the measurement light, and supplies a detection result to the object detector 312.

Based on the detection results of the distributions and peaks in the horizontal direction and time direction (distance direction) of the integrated light receiving value (the intensity of the reflected light), the object detector 312 detects the object in the monitoring area, and supplies a detection result to the controller 21 and the notification part 303.

The notification part 303 supplies the detection result of the object in the monitoring area to the vehicle control device 12.

(Object Detection Processing)

Object detection processing performed by the laser radar device 11 will be described below with reference to a flowchart in FIG. 7.

In Step S1, each MUX 261 selects the light receiving element 202. Specifically, under the control of the controller 21, each MUX 261 selects the light receiving signal to be supplied to the subsequent TIA 262 in the light receiving signals input to the MUXs 261. The light receiving value of the light receiving element 202 that outputs the selected light receiving signal is measured in the following processing. In other words, the intensity of the light reflected from the detection area of the selected light receiving element 202 is measured.

In Step S2, the measurement light projector 22 projects the measurement light. Specifically, under the control of the controller 21, the driving circuit 101 causes the light emitting element 102 to emit the pulsed measurement light. The measurement light emitted from the light emitting element 102 is projected to the whole monitoring area through the projection optical system 103.

In Step S3, the light receiver 24 generates the light receiving signal according to the reflected light. Specifically, each light receiving element 202 receives the light reflected from the detection area in the corresponding direction through the light receiving optical system 201 in the reflected light of the measurement light projected by the processing in Step S2. The light receiving element 202 photoelectrically converts the received reflected light into the light receiving signal that is of an electric signal corresponding to the light receiving quantity of the reflected light, and supplies the obtained light receiving signal to the subsequent MUX 261.

In Step S4, the measurement part 25 samples the light receiving signal. Specifically, under the control of the controller 21, each TIA 262 performs the current-voltage conversion of the light receiving signal supplied from the MUX 261, and amplifies the voltage of the light receiving signal with the gain set by the controller 21. Each TIA 262 supplies the amplified light receiving signal to the subsequent PGA 263.

Under the control of the controller 21, each PGA 263 amplifies the voltage of the light receiving signal supplied from the TIA 262 with the gain set y the controller 21, and supplies the amplified light receiving signal to the subsequent ADC 264.

Under the control of the controller 21, each ADC 264 samples the light receiving signal supplied from the PGA 263, and performs the A/D conversion of the light receiving signal. Each ADC 264 supplies the post-A/D-conversion light receiving signal to the integrator 301.

The light receiving signal sampling processing is described later in detail with reference to FIG. 8.

In Step S5, the integrator 301 integrates the light receiving values up to the previous time and the present light receiving value. Therefore, the light receiving values from the identical light receiving element 202 at the identical sampling clock time are integrated as described later with reference to FIG. 9.

In Step S6, the controller 21 determines whether the light receiving value is measured a predetermined number of times (for example, 100 times). When the controller 21 determines that the light receiving value is not measured the predetermined number of times, the processing returns to Step S2.

Then, the pieces of processing in Steps S2 to S6 are repeatedly performed until the controller 21 determines that the light receiving value is measured the predetermined number of times in Step S6. Therefore, the processing of projecting the measurement light to measure the light receiving value of the selected light receiving element 202 is repeated the predetermined number of times in a predetermined-length measurement period (to be described). The measured light receiving values are integrated.

On the other hand, when the controller 21 determines that the light receiving value is measured the predetermined number of times in Step S6, the processing goes to Step S7.

In Step S7, the controller 21 determines whether the measurement period is repeated a predetermined number of times. When the controller 21 determines that the measurement period is not repeated the predetermined number of times, the processing returns to Step S1.

Then, the pieces of processing in Steps S1 to S7 are repeatedly performed until the controller 21 determines that the measurement period is repeated the predetermined number of times in Step S7. That is, the measurement period is repeated the predetermined number of times in a predetermined-length detection period (to be described). In each measurement period, the light receiving element 202 as a measurement target of the light receiving value is selected, and the detection area as a measurement target of the intensity of the reflected light is switched.

On the other hand, when the controller 21 determines that the measurement period is repeated the predetermined number of times in Step S7, the processing goes to Step S8.

A specific example of the pieces of processing in Steps S1 to S7 will be described below with reference to FIGS. 8 to 10.

Figure 8:
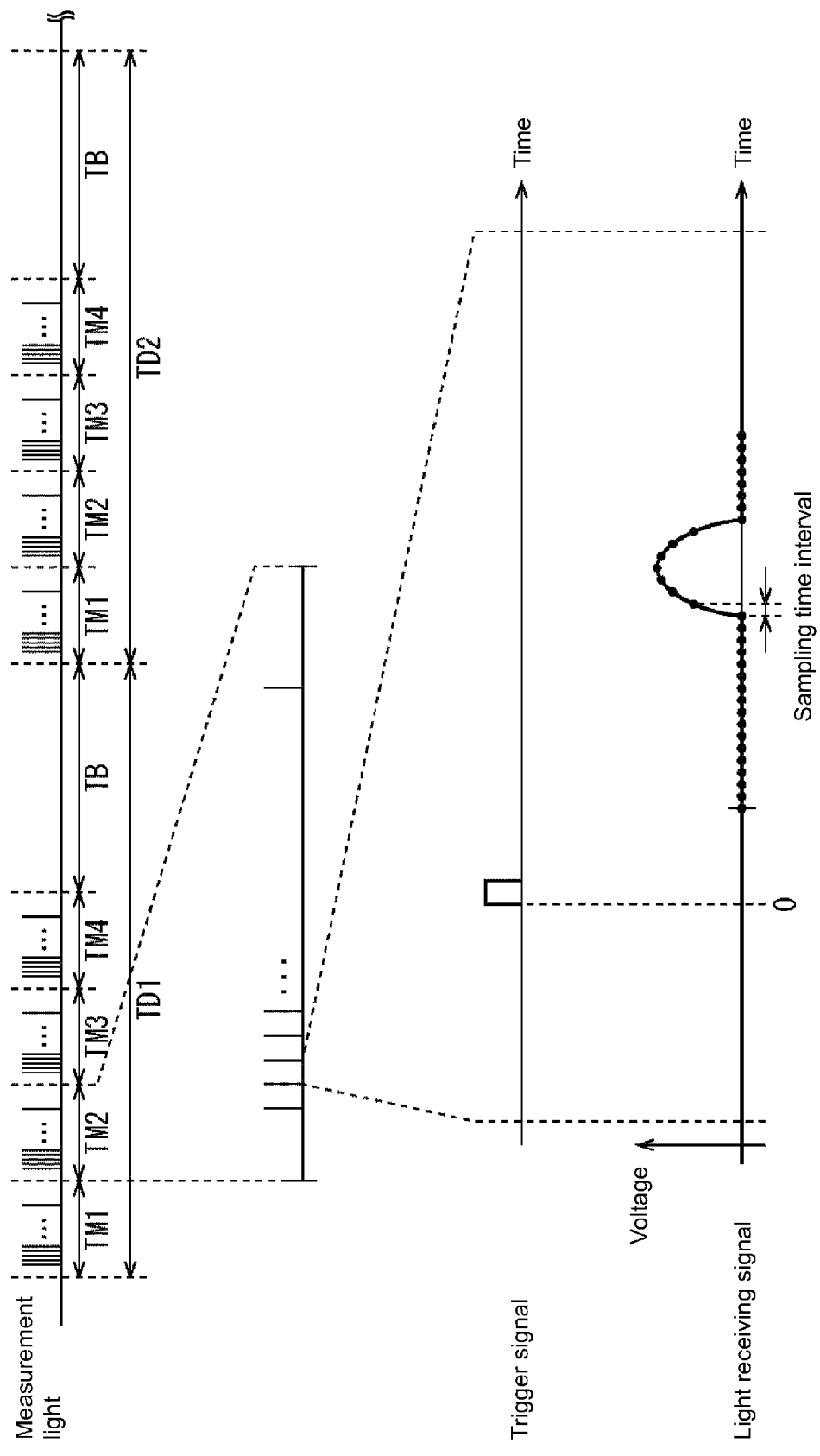
FIG. 8 is a timing chart illustrating the object detection processing.

FIG. 8 is a timing chart illustrating a specific example of the light receiving signal sampling processing. In FIG. 8, a horizontal axis of each stage indicates time.

The topmost stage in FIG. 8 illustrates an emission time of the measurement light. Detection periods TD1, TD2, . . .

are minimum units of periods in each of which the object detection processing is performed, and the object detection processing is performed once in one detection period.

Each detection period includes 4-cycle measurement periods TM1 to TM4 and a pausing period TB. The measurement period is a minimum unit in which the light receiving element 202 measuring the light receiving value is switched. The light receiving element 202 can be selected before each measurement period, while the light receiving element 202 cannot be changed during the measurement period. Accordingly, the light receiving value of the same kind of light receiving element 202 is measured in one measurement period. Therefore, the detection area as the measurement target of the intensity of the reflected light can be switched in units of measurement periods.

The second stage in FIG. 8 is an enlarged view of the measurement period TM2 in the detection period TD1. As illustrated in FIG. 8, the measurement light is projected the predetermined number of times (for example, 100 times) at predetermined time intervals in 1-cycle measurement period.

The third stage in FIG. 8 illustrates a waveform of a trigger signal that specifies a sampling time of the ADC 264, and the fourth stage illustrates the light receiving signal sampling time in the ADC 264. A vertical axis of the fourth stage indicates a value (voltage) of the light receiving signal, and a plurality of black circles on the light receiving signal indicate sampling points. Accordingly, the time between the black circles adjacent to each other is a sampling time interval.

The controller 21 supplies the trigger signal to each ADC 264 after a predetermined time elapses since the measurement light is projected. Each ADC 264 samples the light receiving signal the predetermined number of times (for example, 32 times) at a predetermined sampling frequency (for example, several tens to several hundreds of megahertz) after a predetermined time elapses since the trigger signal is input. That is, every time the measurement light is projected, the light receiving signal selected by the MUX 261 is sampled the predetermined number of times at predetermined sampling time intervals.

For example, assuming that the ADC 264 has a sampling frequency of 100 MHz, the sampling is performed at sampling time intervals of 10 nanoseconds. The light receiving value is sampled at intervals of about 1.5 m in terms of a distance. That is, the intensity of the reflected light from spots at intervals of about 1.5 m in the distance direction from the own vehicle is measured for each detection area.

Each ADC 264 supplies the digital light receiving signal, which indicates the sampling value (light receiving value) at each sampling clock time based on the trigger signal (the clock time the trigger signal is input is set to 0), to the integrator 301.

Thus, the light receiving signal of the light receiving element 202 selected by the MUX 261 is sampled every time the measurement light is projected. Therefore, the intensity of the reflected light is detected in the detection area of the selected light receiving element 202 in units of predetermined distances.

On the other hand, the projection of the measurement light and the measurement of the light receiving value are interrupted in the pausing period TB. The object detection processing based on the measurement results of the light receiving values in the measurement periods TM1 to TM4, the settings, adjustments, and tests of the measurement light projector 22, light receiver 24, and measurement part 25 are performed.

A specific example of light receiving value integration processing will be described below with reference to FIG. 9. FIG. 9 illustrates an example of the integration processing for the light receiving signals of 100 times output from the light receiving element 202 in the case that the measurement light is projected 100 times in the 1-cycle measurement period. In FIG. 9, the horizontal axis indicates a clock (sampling clock time) based on the time (clock time of 0) the trigger signal is input, and the vertical axis indicates the light receiving value (sampling value).

Figure 9:
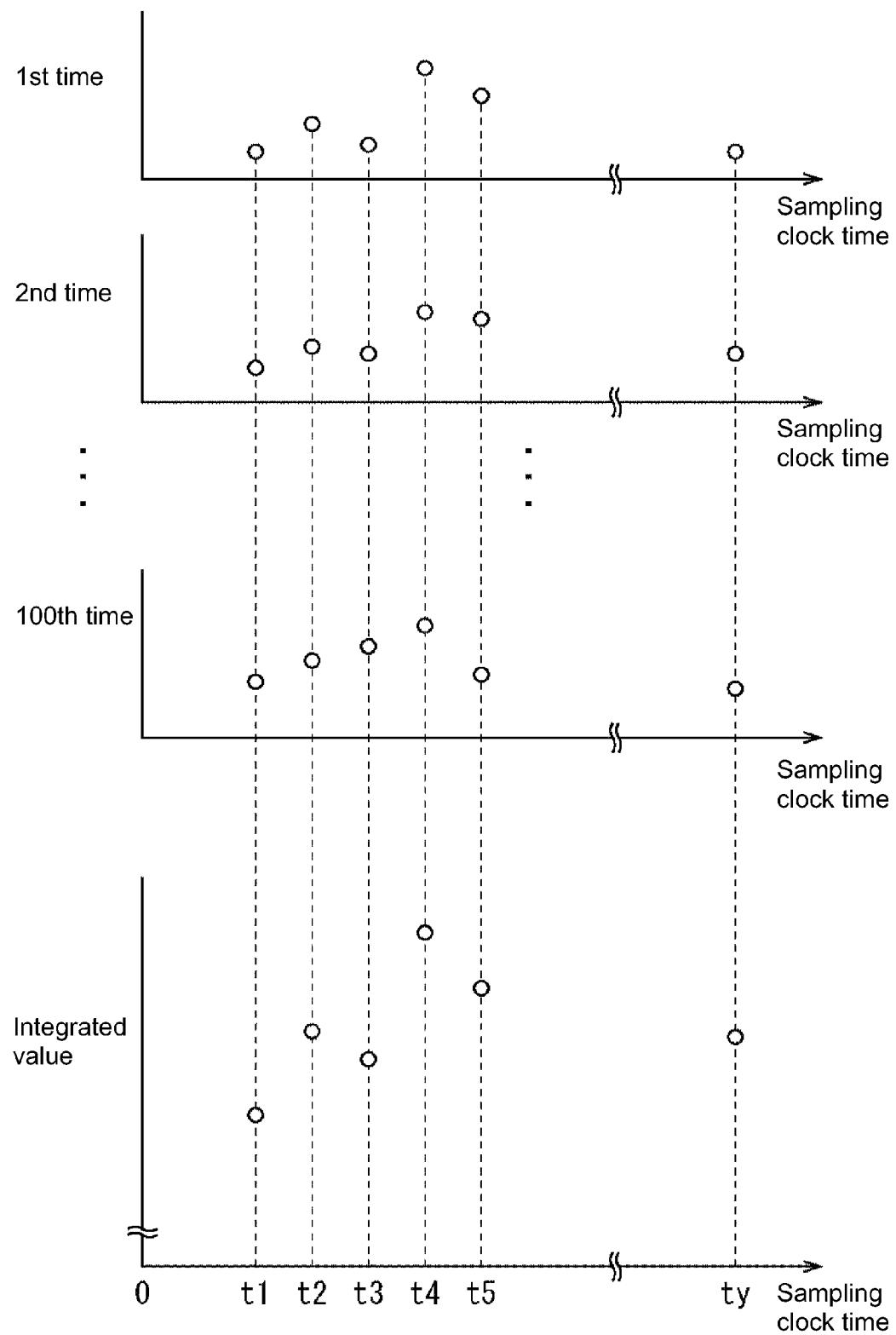
FIG. 9 is a diagram illustrating light receiving value integration processing.

As illustrated in FIG. 9, the light receiving signal is sampled at sampling clock times t1 to ty with respect to the 1st to 100th measurement light beams, and the light receiving values at the identical sampling clock time are integrated. For example, the light receiving values at the sampling clock time t1 are integrated with respect to the 1st to 100th measurement light beams. Thus, the light receiving values of the light receiving signals from the identical light receiving element 202 are integrated, the light receiving values sampled at the identical sampling clock time in the detection period. The integrated value is used in the following processing.

For example, the light receiving values in each of which the light receiving signals from the light receiving elements 202-1 and 202-2 are added are integrated independently of the light receiving values of the light receiving signals from one of the light receiving elements 202-1 and 202-2. In other words, the light receiving values in each of which the light receiving signals from the light receiving elements 202-1 and 202-2 are added are separated from the light receiving values of the light receiving signals from one of the light receiving elements 202-1 and 202-2 as different kinds of light receiving values, and individually integrated.

Through the integration processing, a signal component is amplified even in a low S/N ratio of the light receiving signal of the one-time measurement light, and random noises are averaged and reduced. As a result, the received signal is easily divided into the signal component and the noise component, which allows light sensitivity to be substantially increased. Therefore, for example, the detection accuracy of a distant object or an object having low reflectance is improved.

Hereinafter, a set of the measurement processing and integration processing of the predetermined number of times (for example, 100 times) performed in 1-cycle measurement period is referred to as a measurement integration unit.

Figure 10:
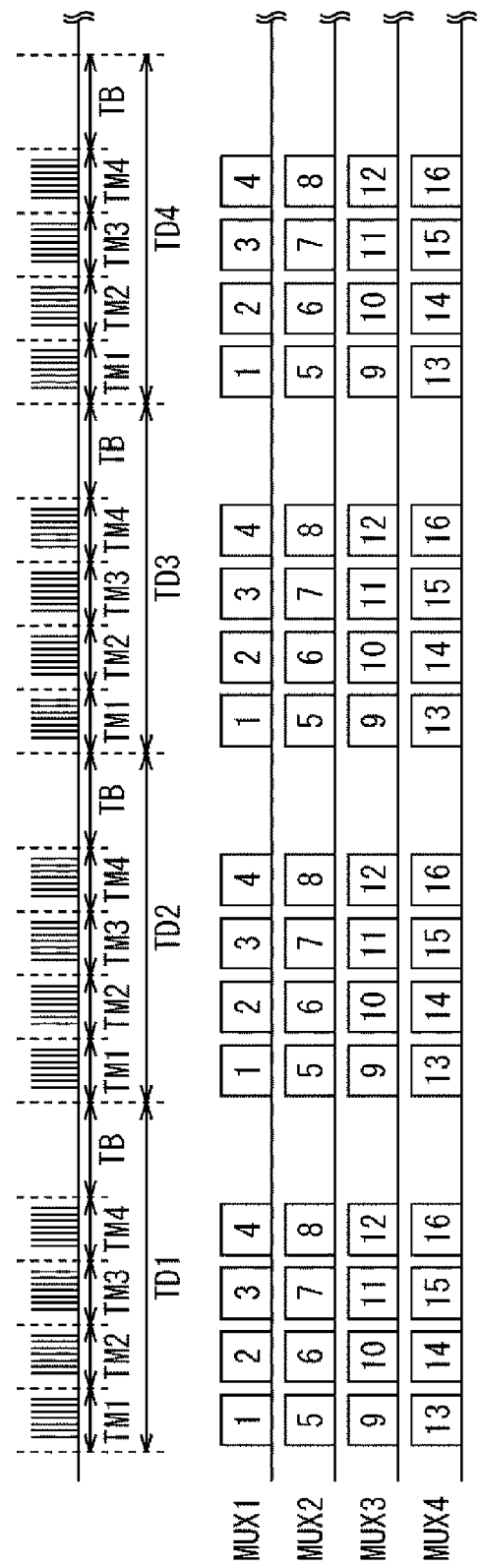
FIG. 10 is a diagram illustrating a first example of a combination of light receiving elements allocated to measurement periods.

FIG. 10 illustrates an example of a selection combination of the light receiving elements 202 of the MUXs 261 in each measurement period. In FIG. 10, MUXs 261-1 to 261-4 are abbreviated to MUXs 1 to 4. In FIG. 10, the number in a square box indicates the number of the light receiving element 202 selected by each of the MUXs 261-1 to 261-4. That is, the light receiving elements 202-1 to 202-16 are indicated by the numbers 1 to 16, respectively.

For example, in the measurement period TM1, the light receiving elements 202-1, 202-5, 202-9, and 202-13 are selected by the MUXs 261-1 to 261-4, respectively, and the light receiving value of each selected light receiving element 202 is measured. In the measurement period TM2, the light receiving elements 202-2, 202-6, 202-10, and 202-14 are selected by the MUXs 261-1 to 261-4, respectively, and the light receiving value of each selected light receiving element 202 is measured. In the measurement period TM3, the light receiving elements 202-3, 202-7, 202-11, and 202-15 are selected by the MUXs 261-1 to 261-4, respectively, and the light receiving value of each selected light receiving element 202 is measured. In the measurement period TM4, the light receiving elements 202-4, 202-8, 202-12, and 202-16 are selected by the MUXs 261-1 to 261-4, respectively, and the light receiving value of each selected light receiving element 202 is measured.

Accordingly, the light receiving values of all the light receiving elements 202 are measured in one detection period. In other words, the intensity of the reflected light from each of all the detection areas in the monitoring area is measured in the one detection period.

Figure 7:
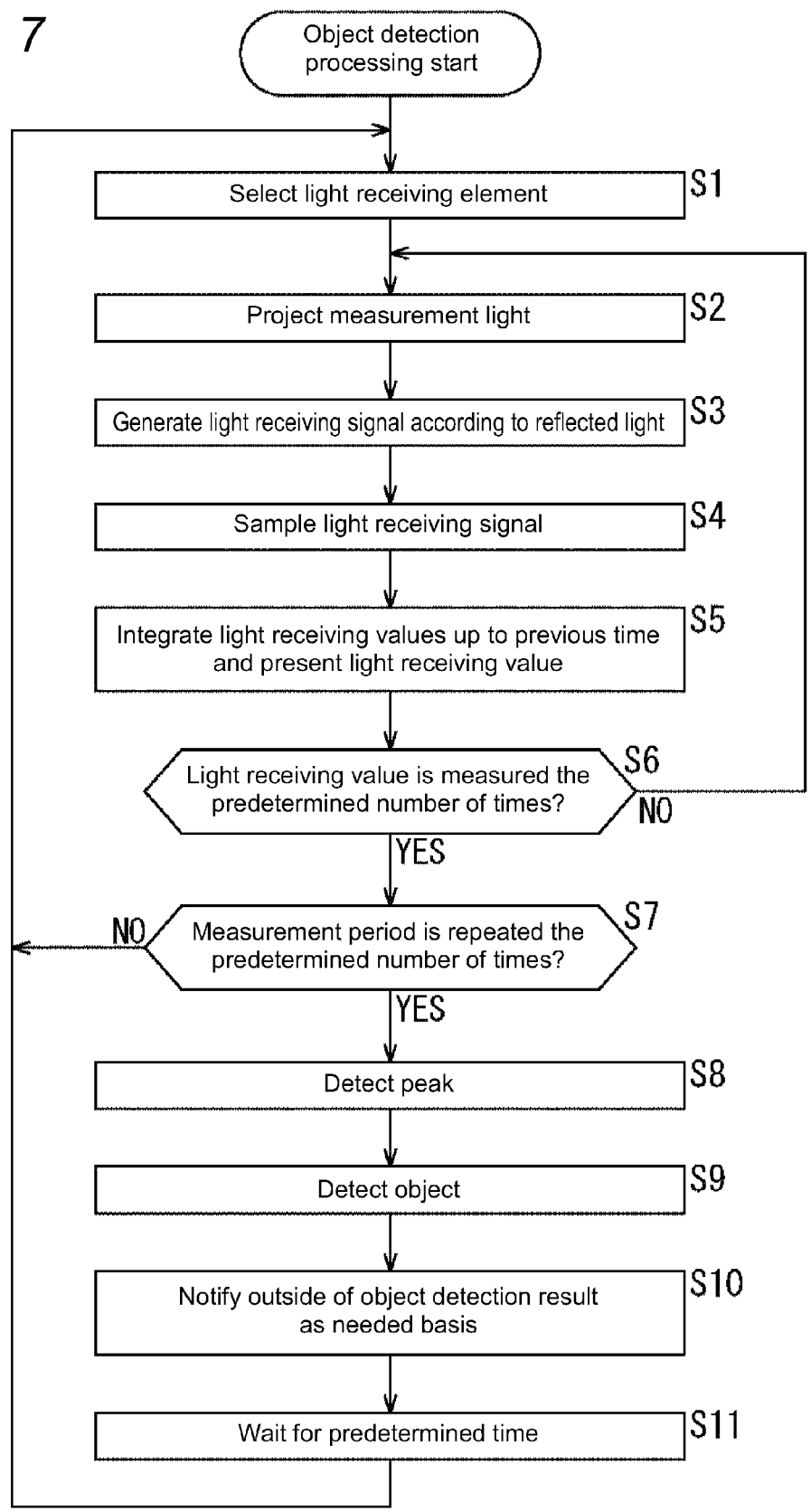
FIG. 7 is a flowchart illustrating object detection processing.

Referring to FIG. 7, the peak detector 311 detects a peak in Step S8. Specifically, the integrator 301 supplies the integrated light receiving values of the light receiving elements 202 in the one detection period to the peak detector 311. Based on the distribution of the integrated light receiving values in each sampling clock time of the light receiving element 202, the peak detector 311 detects the peaks in the horizontal direction and time direction (distance direction) of the intensity of the reflected light in the detection period.

Specifically, the peak detector 311 detects the sampling clock time the integrated light receiving value is maximized in each light receiving element 202. Therefore, the spot where the intensity of the reflected light is maximized in the distance direction from the own vehicle is detected in each detection area. In other words, the distance between the own vehicle and the spot where the intensity of the reflected light is maximized is detected in each detection area.

The peak detector 311 detects the light receiving element 202 (detection area) in which the integrated light receiving value is maximized at each sampling clock time. Therefore, in the distance direction from the own vehicle, a position (detection area) in the horizontal direction, where the intensity of the reflected light is maximized, is detected at predetermined intervals (for example, every about 1.5 m).

The peak detector 311 supplies information indicating the detection result to the object detector 312.

Any method can be adopted as the method for detecting the peak of the peak detector 311.

In Step S9, the object detector 312 detects the object. Specifically, the object detector 312 detects the existence or non-existence of the object such as another vehicle, a pedestrian, and an obstacle in the monitoring area and the kind of, direction of, and distance to the object based on the detection results of the distributions and peaks in the horizontal direction and time direction of the intensity of the reflected light in the detection period. The object detector 312 supplies the information indicating the detection result to the controller 21 and the notification part 303.

Any method can be adopted as the method in which the object detector 312 detects the object.

An example of the object detection method will be described with reference to FIG. 11.

Figure 11:
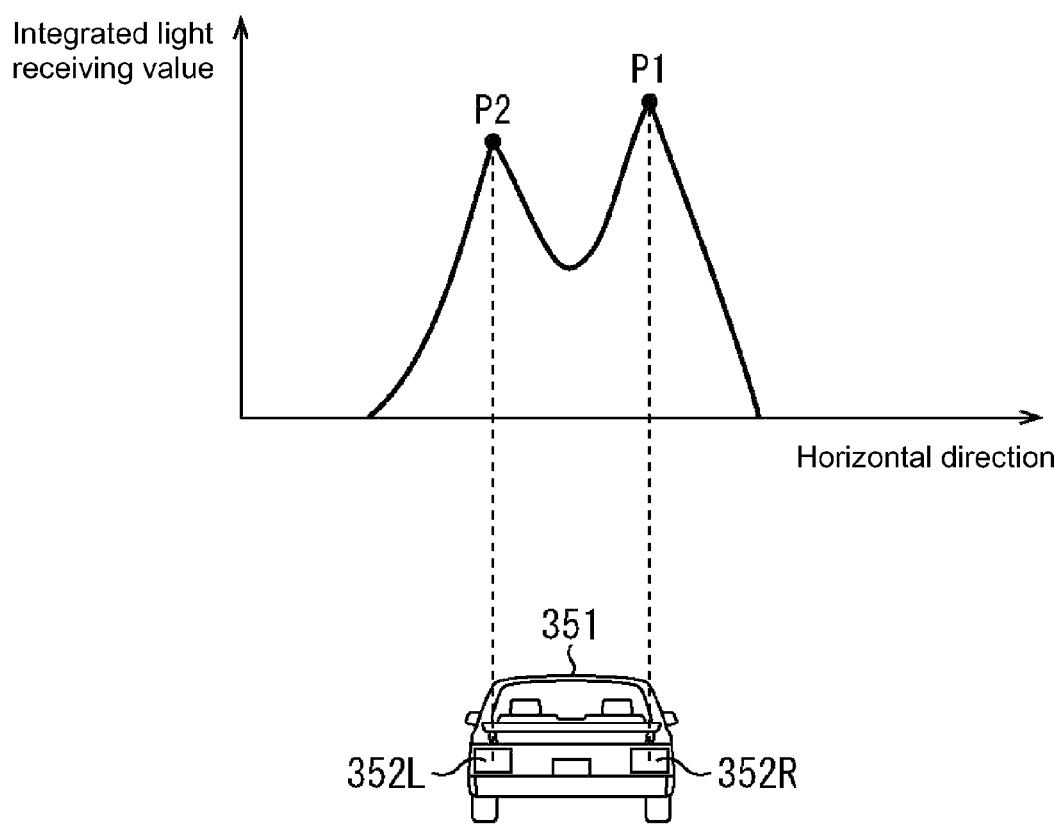
FIG. 11 is a diagram illustrating an example of a vehicle detection method.

A graph in FIG. 11 illustrates the distribution in the horizontal direction of the integrated light receiving values at a sampling clock time around a time at which the light reflected from a vehicle 351 returns in the case that the vehicle 351 runs in front of the own vehicle. In the graph of FIG. 11, the integrated light receiving values of the light receiving elements 202 at the sampling clock time are arrayed in the horizontal axis direction in the order in which the light receiving elements 202 are arrayed in the horizontal direction.

The measurement light is reflected by the vehicle 351 and received by the light receiving element 202, and a time difference is generated between the light projection and light reception. Because the time difference is proportional to the distance between the laser radar device 11 and the vehicle 351, the light reflected from the vehicle 351 is measured as the light receiving value at the sampling time (sampling clock time tn) that agrees with the time difference. Accordingly, the integrated light receiving value is particularly increased at the sampling clock time tn in the integrated light receiving values of the light receiving elements 202 in the detection area including the vehicle 351.

In the case that the vehicle 351 exists in front of the own vehicle, the integrated light receiving values of the light receiving elements 202 including the vehicle 351 in the detection areas are increased because the light reflected from the vehicle 351 is received by the light receiving elements 202. Because reflectance is increased at left and right reflectors 352L and 352R in a rear portion of the vehicle 351, the integrated light receiving values of the light receiving elements 202 including reflectors 352L and 352R in the detection areas are particularly increased.

Accordingly, as illustrated in the graph of FIG. 11, two prominent peaks P1 and P2 emerge in the distribution of the integrated light receiving values in the horizontal direction. Since the light reflected by a vehicle body between the reflectors 352L and 352R is also detected, the integrated light receiving values between the peaks P1 and P2 are also higher compared with values of other areas. The vehicle in front can be detected by detecting the two prominent peaks in the distribution of the integrated light receiving values in the horizontal direction at the identical sampling clock time.

In Step S10, the notification part 303 notifies the outside of the object detection result as needed basis. For example, the notification part 303 periodically supplies the object detection result to the vehicle control device 12 irrespective of the existence or non-existence of the object. Alternatively, for example, the notification part 303 supplies the object detection result to the vehicle control device 12 only when the own vehicle is at risk for colliding with the vehicle in front.

In Step S11, the controller 21 waits for a predetermined time. That is, the controller 21 waits so as not to project the measurement light until the pausing period TB in FIG. 8 is ended.

Then, the processing returns to Step S1, and the pieces of processing in Steps S1 to S11 are repeatedly performed. That is, the processing of detecting the object is repeated in each detection period based on the integrated light receiving value.

As described above, the light receiving values of the light receiving elements 202 at each sampling clock time are integrated to detect the object, so that the reflected light sensitivity can be increased to improve the object detection accuracy in the monitoring area.

The 4-cycle measurement periods are provided in one detection period to switch the light receiving element 202 measuring the light receiving value, so that the object can be detected from the detection areas in the monitoring area in each detection period while the numbers of TIAs 262, PGAs 263, and ADCs 264 are constrained. Therefore, a circuit scale and a calculation quantity, which are required to measure and integrate the light receiving values, can be constrained.

In the above description, by way of example, the light receiving values of the light receiving elements 202 are repeatedly measured in the predetermined sequence, which allocates one measurement period to each light receiving element 202 in one detection period. In other words, by way of example, a measurement integration unit is performed once to each light receiving element 202 in each one detection period. In this case, the whole monitoring area can widely and uniformly be monitored.

On the other hand, as described above, each MUX 261 can freely select the light receiving signal, and the combination of the light receiving elements 202 measuring the light receiving values can freely be set. That is, in each light receiving element 202, the measurement integration unit may be performed up to 4 times, or may not be performed in one detection period.

Accordingly, a frequency of the measurement integration unit performed to each light receiving element 202 can be adjusted according to a need for monitoring each detection area. A frequency of performance of the measurement integration unit may be increased to increase the number of integration times of the light receiving values with respect to the detection area having the high need for the monitoring, such as the area where the object is detected, the area where the object probably exists, and the area having a high risk, which allows the detection area to be intensively monitored. On the other hand, the frequency of performance of the measurement integration unit may be decreased to decrease the number of integration times of the light receiving values with respect to the detection area having the low need for the monitoring, such as the area where the object is not detected, the area where the object probably does not exist, and the area having a low risk, which allows the detection area to be intermittently monitored.

Thus, hardware and software resources of the laser radar device 11 can more effectively be used by properly adjusting the frequency of performance of the measurement integration unit with respect to each of the light receiving elements 202 (detection area).

Figure 12:
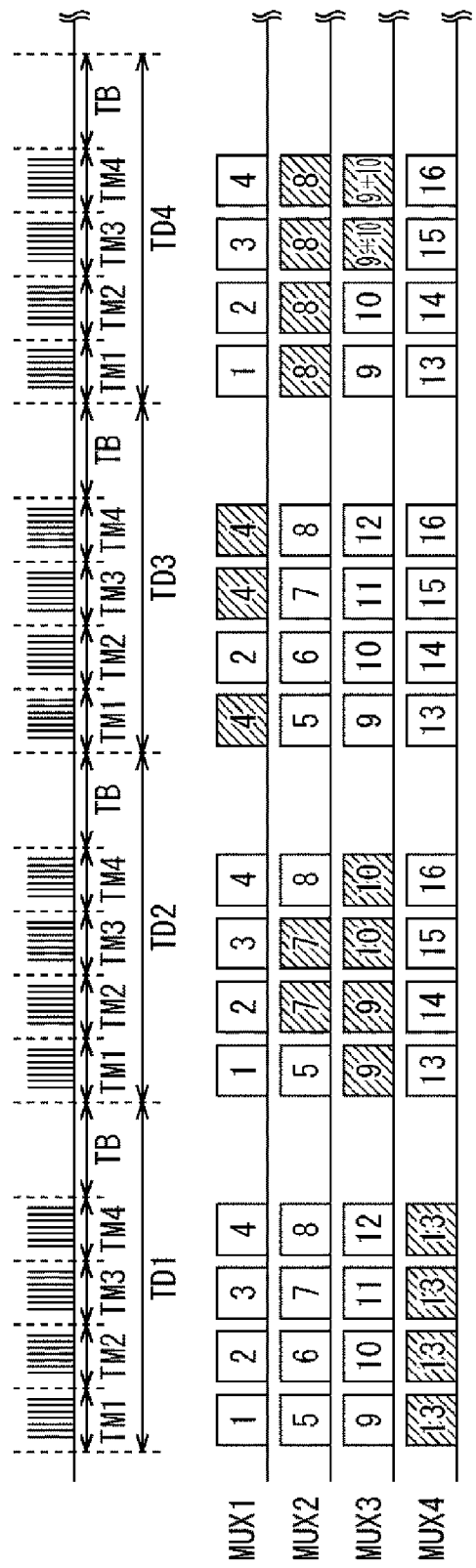
FIG. 12 is a diagram illustrating a second example of the combination of the light receiving elements allocated to the measurement periods.

In the example of FIG. 12, in the detection period TD1, the measurement integration unit is not performed to the light receiving elements 202-14 to 202-16, but the measurement integration unit is performed 4 times to the light receiving element 202-13. Therefore, the integrated light receiving value of the light receiving element 202-13 becomes 4 times compared with the case that the measurement integration unit is performed once, and the light sensitivity of the light receiving element 202-13 can be enhanced.

As described above, the method for allocating the light receiving element 202 in each measurement period can freely be changed. For example, like the detection period TD2, the intermediate measurement periods TM2 and TM3 can be allocated to the light receiving element 202-7, and a sequence of measurement periods TM1 and TM2 and a sequence of measurement periods TM3 and TM4 can be allocated to the light receiving elements 202-9 and 202-10 connected to the MUX 261-3, respectively. For example, like the detection period TD3, the measurement period can discontinuously be allocated to the light receiving element 202-4.

As described above, each MUX 261 can output at least two light receiving signals while adding the light receiving signals. For example, like the detection period TD4 in FIG. 12, the light receiving signals of the light receiving elements 202-9 and 202-10 can be added to perform the measurement integration unit. Therefore, although horizontal resolution decreases, the integrated light receiving value increases with respect to an area where the detection areas of the light receiving elements 202-9 and 202-10 are combined, and the light sensitivity to the combined area can be improved.

As described above, the light receiving values in each of which the light receiving signals from the light receiving elements 202-9 and 202-10 are added are integrated independently of the light receiving values of the light receiving signals from one of the light receiving elements 202-9 and 202-10.

In the above description, by way of example, the light receiving value integration processing is performed in units of detection periods. Alternatively, the light receiving value integration processing may be performed throughout the detection periods of a plurality of times.

Figure 13:
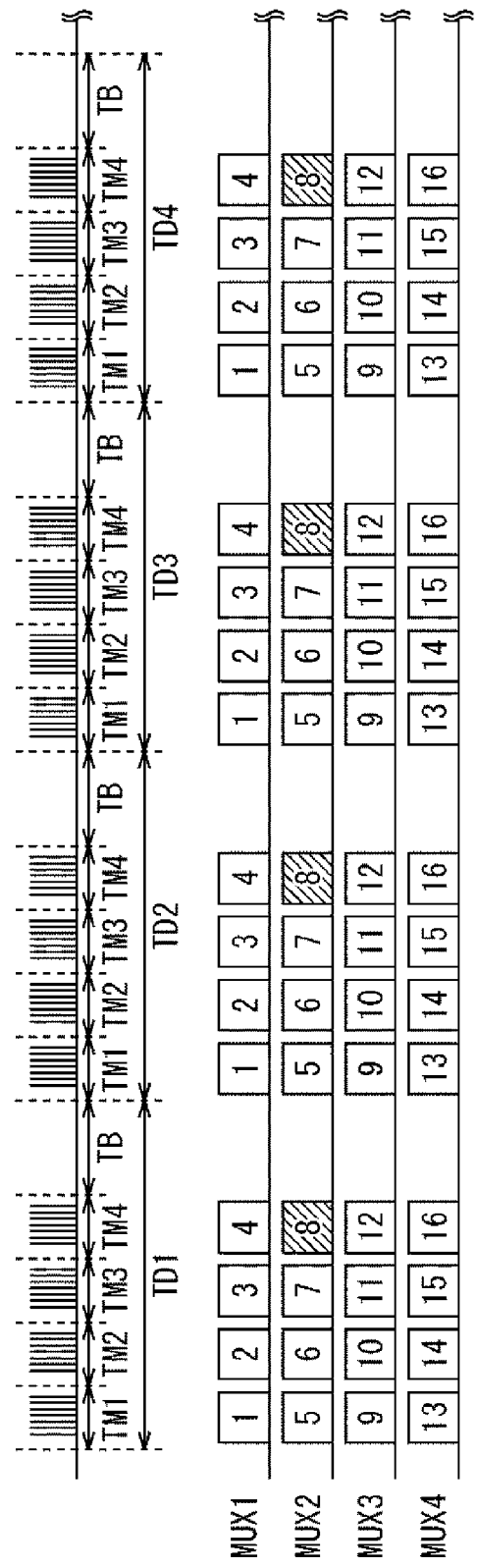
FIG. 13 is a diagram illustrating a third example of the combination of the light receiving elements allocated to the measurement periods.

For example, as illustrated in FIG. 13, the light receiving values of the light receiving element 202-8 throughout the detection periods of the 4 times may be integrated while the measurement integration unit is performed once to each light receiving element 202 in each detection period. Specifically, for example, the light receiving values of the light receiving element 202-8 in the detection periods TD1 to TD4 may be integrated in the detection period TD4. Therefore, the integrated light receiving value of the light receiving element 202-8 is 4 times compared with the case that the light receiving value integration processing is performed in each detection period, and the light sensitivity of the light receiving element 202-8 can be enhanced.

The light receiving values of the light receiving element 202-8 in the 4-cycle measurement periods are integrated in the example in the detection period TD4 of FIG. 12 and the example of FIG. 13. In the example of FIG. 12, the light receiving values are integrated the more number of times in a shorter period, so that an object detection speed of the light receiving element 202-8 can be enhanced in the detection area. On the other hand, in the example of FIG. 13, the measurement integration unit is continuously performed to other light receiving elements 202, so that the light sensitivity of the light receiving element 202-8 can be enhanced without decreasing the light sensitivity of other light receiving elements 202.

A specific example of the method for switching the frequency of performance of the measurement integration unit to each light receiving element 202 will be described below. Specifically, the case that broad monitoring and traveling direction monitoring are switched will be described by way of example. In the broad monitoring, the whole detection area is uniformly monitored as illustrated in the example of FIG. 10. In the traveling direction monitoring, the plurality of detection areas in the vehicle traveling direction (the center in front of the vehicle) are intensively monitored.

In the broad monitoring, for example, the selector 251 (each MUX 261) uniformly selects the light receiving elements 202, and therefore the detection areas are uniformly monitored. On the other hand, in the traveling direction monitoring, for example, the frequency of the selection of the light receiving element 202 receiving the reflected light from the vehicle traveling direction is enhanced in the selector 251 (each MUX 261), and therefore the detection area of the light receiving element 202 is intensively monitored.

For example, the broad monitoring is performed when the vehicle runs at low speed less than a predetermined threshold, and the traveling direction monitoring is performed when the vehicle runs at high speed greater than or equal to the predetermined threshold. Therefore, the farther object can more rapidly be detected during high-speed running. In the case that the traveling direction monitoring is performed during the high-speed running, desirably the broad monitoring or monitoring in the direction other than the traveling direction is performed at predetermined time intervals.

For example, the broad monitoring and the traveling direction monitoring may alternately be performed until the object is detected, and the broad monitoring may repeatedly be performed after the object is detected. Therefore, the object can rapidly be detected in each direction in the monitoring area. Additionally, the broad monitoring is repeated after the object is detected, which allows the detected object to be surely tracked.

2. Modifications

Modifications of an illustrative embodiment will be described below.

The configuration of the laser radar device 11 is not limited to the example in FIG. 1, but various changes can be made as needed basis.

For example, the controller 21 and the calculator 26 may be combined, or the allocations of the functions of the controller 21 and calculator 26 may be changed.

For example, the numbers of light receiving elements 202, MUXs 261, TIAs 262, PGAs 263, and ADCs 264 may be increased or decreased as needed basis.

For example, the number of light receiving elements 202 may be increased to widen the monitoring area or fragment the detection area in the monitoring area. On the other hand, the number of light receiving elements 202 may be decreased to narrow the monitoring area or combine the detection areas in the monitoring area.

For example, the number of light receiving signals that are concurrently sampled can be increased or decreased by changing the number of combinations of the MUXs 261, TIAs 262, PGAs 263, and ADCs 264.

For example, the number of light receiving elements 202 connected to one MUX 261 may be changed. For example, the numbers of light receiving elements 202 connected to the MUXs 261 are not necessarily equal to each other.

For example, the combination of the light receiving elements 202 connected to each MUX 261 is not limited to the above example. For example, the light receiving elements 202-1, 202-5, 202-9, and 202-13 may be connected to the MUX 261-1, the light receiving elements 202-2, 202-6, 202-10, and 202-14 may be connected to the MUX 261-2, the light receiving elements 202-3, 202-7, 202-11, and 202-15 may be connected to the MUX 261-3, and the light receiving elements 202-4, 202-8, 202-12, and 202-16 may be connected to the MUX 261-4. Therefore, in the 1-cycle measurement period, the measurement integration unit can simultaneously be performed to the four light receiving elements 202 adjacent to one another. For example, the detection areas of the light receiving elements 202-5 to 202-8 adjacent to one another can intensively be monitored.

The number of outputs of the MUX may be set to at least two. That is, the MUX may select at least the two light receiving signals from the input light receiving signals and separately output the light receiving signals. An example of the specific configuration of the MUX including at least two outputs will be described with reference to FIGS. 14 and 15.

Figure 14:
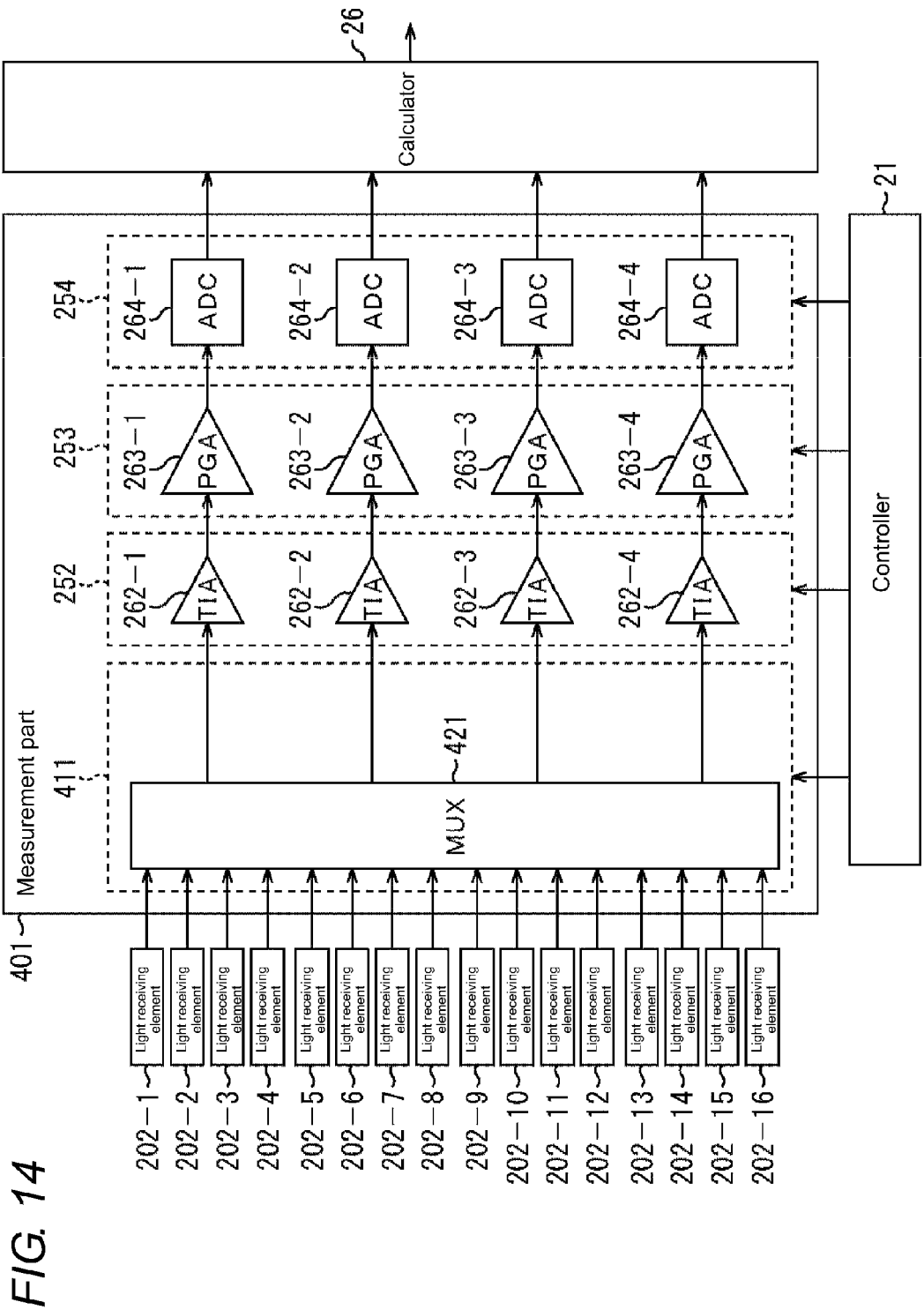
FIG. 14 is a block diagram illustrating a measurement part according to a modification.

FIG. 14 illustrates a configuration example of a measurement part 401 that can be used instead of the measurement part 25 in FIG. 4. In FIG. 14, the component equivalent to that in FIG. 4 is designated by the identical numeral.

The measurement part 401 differs from the measurement part 25 in FIG. 4 in that a selector 411 is provided instead of the selector 251. The selector 411 includes a MUX 421.

Figure 15:
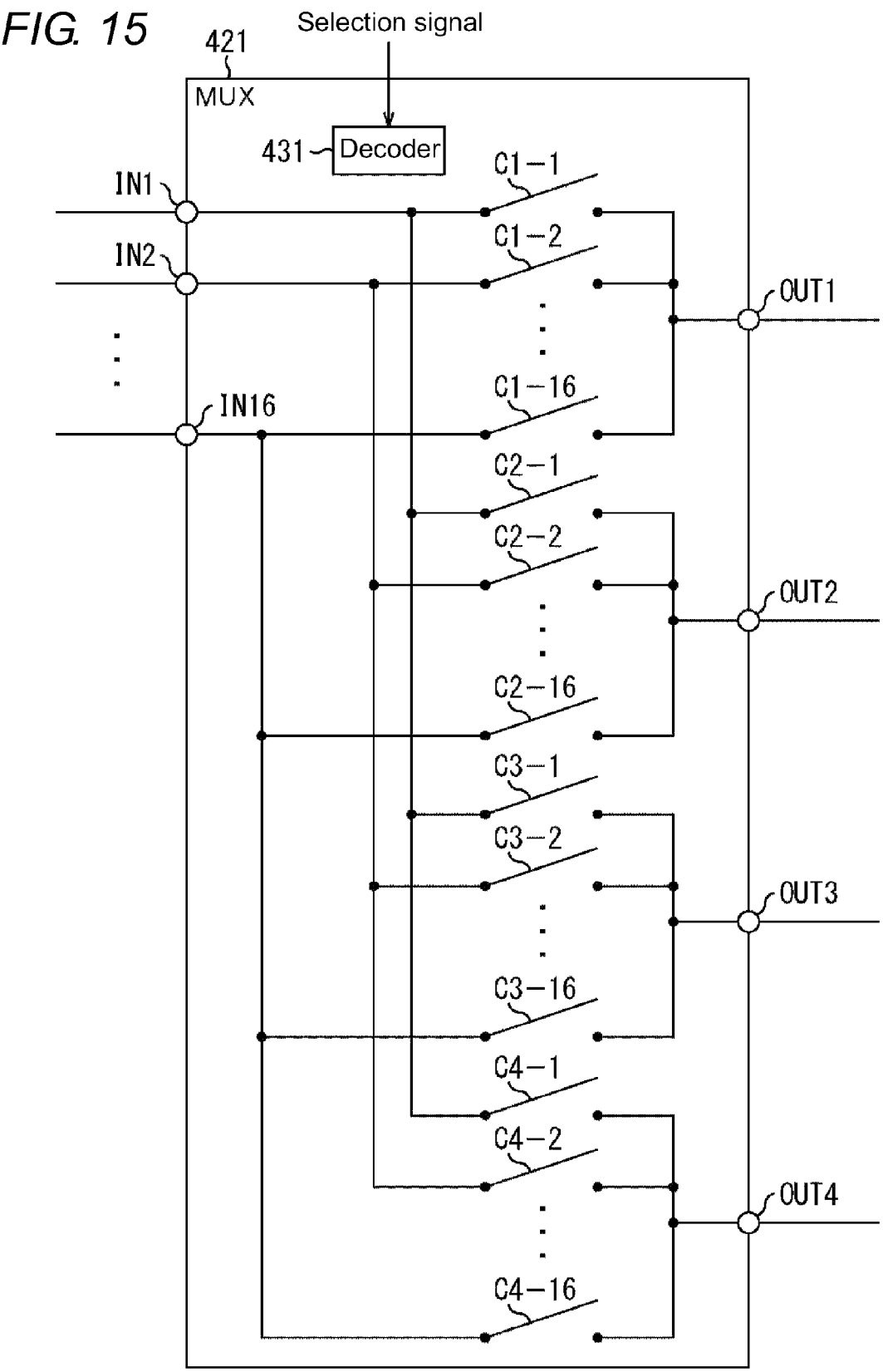
FIG. 15 is a block diagram illustrating a configuration example of a function of a multiplexer according to a modification.

FIG. 15 schematically illustrates a configuration example of a function of the MUX 421.

The MUX 421 includes a decoder 431, input terminals IN1 to IN16, contacts C1-1 to C1-16, contacts C2-1 to C2-16, contacts C3-1 to C3-16, contacts C4-1 to C4-16, and output terminals OUT1 to OUT4. One end of each of the contacts C1-$i$ to C4-$i$ ($i$=1 to 16) is connected to the input terminal IN$i$. In the contacts Cj-1 to Cj-16 ($j$=1 to 4), one end different from the one end connected to each of the input terminals IN1 to IN16 is connected to an output terminal OUTj.

The input terminals IN1 to IN16 are connected to the light receiving elements 202-1 to 202-16, and the output terminals OUT1 to OUT4 are connected to the TIAs 262-1 to 262-4.

Hereinafter, the input terminals IN1 to IN16 and the contacts C1 to C4 are simply referred to as an input terminal IN and a contact C unless each of the input terminals IN1 to IN16 and the contacts C1 to C4 needs to be distinguished from one another. Hereinafter, the contacts C1-1 to C1-16, the contacts C2-1 to C2-16, the contacts C3-1 to 03-16, and the contacts C4-1 to C4-16 are simply referred to as a contact C1, a contact C2, a contact C3, and a contact C4 unless each of the contacts C1-1 to C1-16, the contacts C2-1 to C2-16, the contacts C3-1 to C3-16, and the contacts C4-1 to C4-16 needs to be distinguished from one another.

The decoder 431 decodes the selection signal supplied from the controller 21, and individually switches between the on and off states of each contact C1 according to a content of the decoded selection signal. The light receiving signal, which is input to the input terminal IN connected to the contact C1 in the on state, is selected and output from the output terminal OUT1. In the case that a plurality of contacts C1 are in the on states, the plurality of selected light receiving signals are added and output from the output terminal OUT1. Therefore, at least any one light receiving element 202 is selected from the light receiving elements 202-1 to 202-16, and the light receiving signal of the selected light receiving element 202 can be output from the output terminal OUT1.

Similarly, the decoder 431 can select at least any one light receiving element 202 from the light receiving elements 202-1 to 202-16 by individually switching between the on and off states of each contact C2 according to a content of the decoded selection signal, and the decoder 431 can output the light receiving signal of the selected light receiving element 202 from the output terminal OUT2. The decoder 431 can select at least any one light receiving element 202 from the light receiving elements 202-1 to 202-16 by individually switching between the on and off states of each contact C3 according to a content of the decoded selection signal, and the decoder 431 can output the light receiving signal of the selected light receiving element 202 from the output terminal OUT3. The decoder 431 can select at least any one light receiving element 202 from the light receiving elements 202-1 to 202-16 by individually switching between the on and off states of each contact C4 according to a content of the decoded selection signal, and the decoder 431 can output the light receiving signal of the selected light receiving element 202 from the output terminal OUT4.

Therefore, any combination of the light receiving signals of the light receiving elements 202 can be output from the output terminals OUT1 to OUT4, and the freer combination of the light receiving elements 202 can be selected compared with the case that the MUXs 261-1 to 261-1 are used. Accordingly, the detection areas to be monitored can more flexibly be combined, and the object detection accuracy can be improved.

At least two MUXs 421 including the plurality of outputs may be used.

Assuming that n1 is the number of light receiving elements 202, that n2 is a total of the number of outputs of the selector 251 or the number of outputs of the selector 411, and that c is the number of cycles of the measurement periods in one detection period, desirably each value is set such that n1≥c×n2 holds. Therefore, in one detection period, the measurement integration unit can be performed to all the light receiving elements 202.

In the above description, by way of example, the object detection processing is performed once in each one detection period. Alternatively, for example, as needed basis, the light receiving values may be integrated throughout at least two detection periods, and the object detection processing may be performed once every at least two detection periods.

One or more embodiments of the disclosure can be applied to not only the case that the measurement light is projected a plurality of times in one measurement period but also the case that the measurement light is projected once in one measurement period.

One or more embodiments of the disclosure can also be applied to a laser radar device that is used in applications other than the vehicle.

[Configuration Example of Computer]

The above sequence of pieces of processing can be performed by hardware and software. In the case that the sequence of pieces of processing is performed by the software, a program constituting the software is installed in a computer. At this point, examples of the computer include a computer incorporated in dedicated hardware and a general-purpose personal computer that can perform various functions by installing various programs therein.

Figure 16:
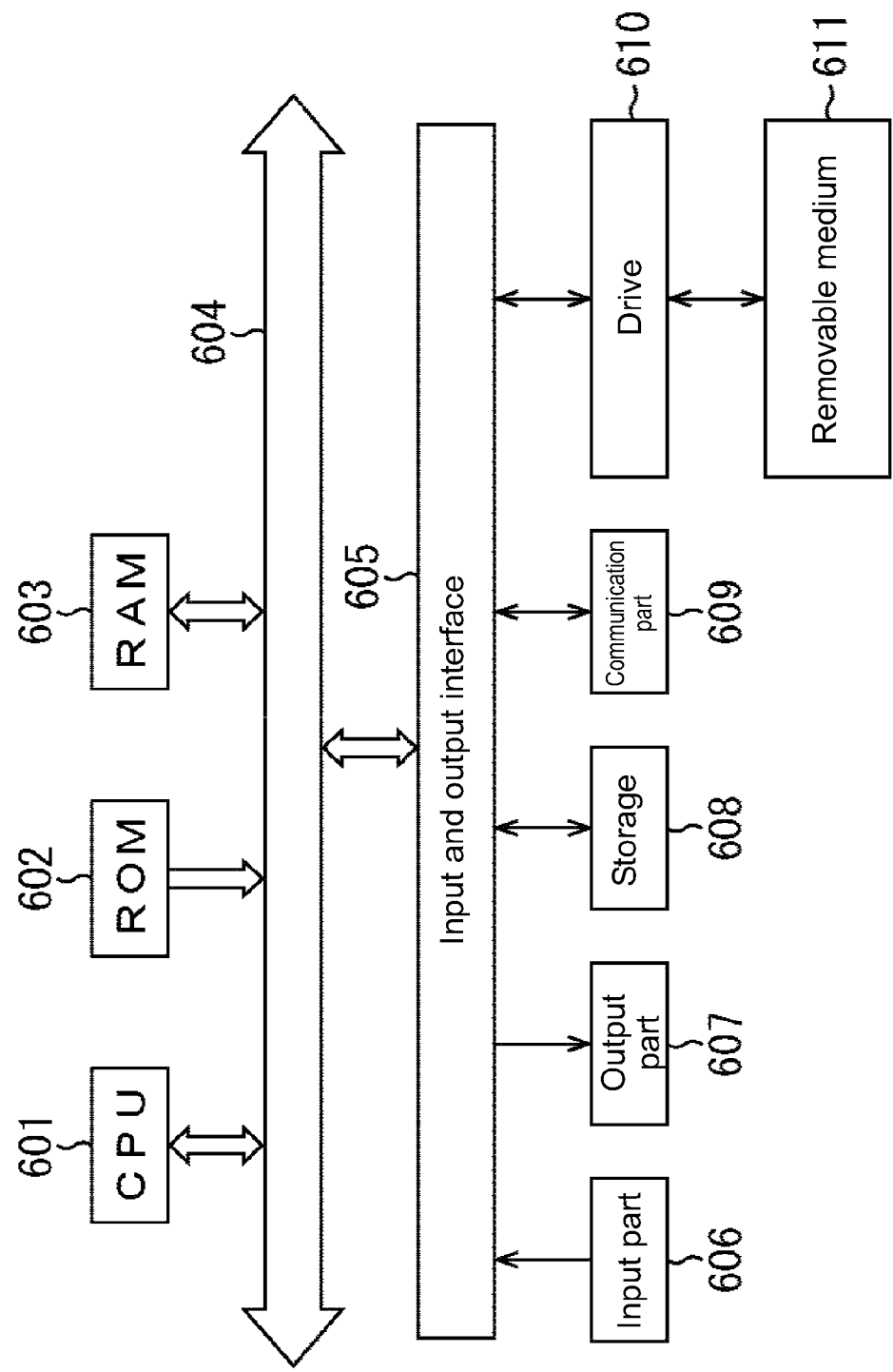
FIG. 16 is a block diagram illustrating a configuration example of a computer.

FIG. 16 is a block diagram illustrating a configuration example of computer hardware of the computer that executes a sequence of pieces of processing using the program.

In the computer, a CPU (Central Processing Unit) 601, a ROM (Read Only Memory) 602, and a RAM (Random Access Memory) 603 are connected to one another through a bus 604.

An input and output interface 605 is also connected to the bus 604. An input part 606, an output part 607, a storage 608, a communication part 609, and a drive 610 are connected to the input and output interface 605.

For example, the input part 606 is constructed with a keyboard, a mouse, and a microphone. For example, the output part 607 is constructed with a display and a speaker. For example, the storage 608 is constructed with a hard disk and a nonvolatile memory. For example, the communication part 609 is constructed with a network interface. The drive 610 drives a removable medium 611 such as a magnetic disk, an optical disk, a magneto-optical disk, and a semiconductor memory.

In the computer having the above configuration, for example, the CPU 601 loads the program stored in the storage 608 in the RAM 603 through the input and output interface 605 and the bus 604, and executes the program, thereby performing the sequence of pieces of processing.

For example, the program executed by the computer (CPU 601) can be provided while recorded in the removable medium 611 as a package medium. The program can also be provided through a wired or wireless transmission medium such as a local area network, the Internet, and digital satellite broadcasting.

In the computer, the program can be installed in the storage 608 through the input and output interface 605 by attaching the removable medium 611 to the drive 610. The program can be received by the communication part 609 through the wired or wireless transmission medium, and installed in the storage 608. Additionally, the program can be previously installed in the ROM 602 or the storage 608.

The program executed by the computer may be a program that performs the pieces of processing in time series along the order described in an illustrative embodiment, a program that concurrently performs the pieces of processing, or a program that performs the pieces of processing at a necessary time such as a time calling is performed.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A laser radar device provided in a vehicle, comprising:
    a projection part configured to repeatedly perform processing of projecting measurement light that is of a pulsed laser beam to a predetermined monitoring area in a measurement period having a predetermined first length, the processing being repeated in c cycles (c≥2) in a detection period having a predetermined second length;
    a light receiver that comprises n1 (n1≥2) light receiving elements and is configured to receive reflected light of the measurement light in directions different from one another;
    a selector configured to select light receiving signals of the n1 light receiving elements in each measurement period and output n2 (n2≥2) light receiving signals;
    a sampling part configured to sample the light receiving signals output from the selector s (s≥2) times every time the measurement light is projected; and
    a detector configured to perform processing of detecting an object in a detection-period-based period based on sampling values obtained by the sampling,
    wherein the selector alternately repeats first selection processing of uniformly selecting the light receiving signal of each of the light receiving elements and second selection processing in which a frequency of selecting the light receiving signal of the light receiving element receiving reflected light from a traveling direction of the vehicle is increased when the detector does not detect the object, and the selector repeats the first selection processing when the detector detects the object.

2. The laser radar device according to claim 1, wherein the selector selects the light receiving signals from the n1 light receiving elements, adds the plurality of selected light receiving signals, and outputs the added light receiving signal.

3. The laser radar device according to claim 1, further comprising:
    an integrator configured to integrate sampling values of the light receiving signals from the identical light receiving element, the sampling values being sampled at an identical sampling clock time in the detection period,
    wherein the projection part projects the measurement light a plurality of times in the measurement period.

4. The laser radar device according to claim 3, wherein the integrator integrates the sampling values throughout the plurality of detection periods.

5. The laser radar device according to claim 1, wherein the selector makes a selection from the light receiving signals in each of n2 groups and outputs one light receiving signal in each group, the n1 light receiving elements being divided into the n2 groups.

6. The laser radar device according to claim 1, wherein n1≤c×n2 holds.

7. The laser radar device according to claim 1, wherein the sampling part comprises n2 A/D converters configured to concurrently sample the n2 light receiving signals output from the selector.

8. The laser radar device according to claim 1, wherein the selector increases a frequency of selecting the light receiving signal of the light receiving element receiving reflected light from a traveling direction of the vehicle when the speed of the vehicle is greater than or equal to a predetermined threshold.

9. An object detection method provided in a vehicle, comprising:

a projection step of repeatedly performing processing of projecting measurement light that is of a pulsed laser beam to a predetermined monitoring area in a measurement period having a predetermined first length, the processing being repeated in c cycles (c≥2) in a detection period having a predetermined second length;

a light receiving step in which n1 (n1≥2) light receiving elements receive reflected light of the measurement light in directions different from one another;

a selection step of selecting light receiving signals of the n1 light receiving elements in each measurement period and outputting n2 (n2≥2) light receiving signals;

a sampling step of sampling the light receiving signals output from the selection steps s (s≥2) times every time the measurement light is projected; and a detection step of performing processing of detecting an object in a detection-period-based period based on sampling values obtained by the sampling, wherein the selection step alternately repeats first selection processing of uniformly selecting the light receiving signal of each of the light receiving elements and second selection processing in which of frequency of selecting the light receiving signal of the light receiving element receiving reflected light from a traveling direction of the vehicle is increased when the detection step does not detect the object, and the selection step repeats the first selection processing when the detection step detects the object.

* * * * *